United States Patent
Ito et al.

(10) Patent No.: US 6,711,344 B1
(45) Date of Patent: Mar. 23, 2004

(54) DATA REPRODUCTION USING TIME SLOT ALLOCATION

(75) Inventors: Norikazu Ito, Kanagawa (JP); Hiroyuki Fujita, Kanagawa (JP); Satoshi Yoneya, Kanagawa (JP); Masakazu Yoshimoto, Kanagawa (JP); Satoshi Katsuo, Kanagawa (JP); Jun Yoshikawa, Kanagawa (JP); Satoshi Yutani, Kanagawa (JP); Koichi Sato, Tokyo (JP); Tomohisa Shiga, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/251,121

(22) Filed: Feb. 16, 1999

(30) Foreign Application Priority Data

Feb. 17, 1998 (JP) ............................................. 10-034859

(51) Int. Cl.⁷ ......................... H04N 5/781; H04N 5/783
(52) U.S. Cl. ............................ 386/68; 386/82; 386/125
(58) Field of Search ........................... 386/45, 125–126, 386/68–82, 6–8; 725/87–88, 92–97, 102–104, 114–117, 138, 144–147, 139–142, 151–153; 710/45; 711/114; H04N 5/76, 5/92, 5/781

(56) References Cited

U.S. PATENT DOCUMENTS

| | | | | |
|---|---|---|---|---|
| 5,764,893 A | * | 6/1998 | Okamoto et al. | 725/88 |
| 5,815,146 A | * | 9/1998 | Youden et al. | 725/88 |
| 5,862,403 A | * | 1/1999 | Kanai et al. | 710/6 |
| 6,067,636 A | * | 5/2000 | Yao et al. | 714/15 |
| 6,212,657 B1 | * | 4/2001 | Wang et al. | 714/746 |
| 6,230,200 B1 | * | 5/2001 | Forecast et al. | 709/226 |
| 6,279,055 B1 | * | 8/2001 | Ito et al. | 710/45 |

* cited by examiner

Primary Examiner—Thai Tran
(74) Attorney, Agent, or Firm—Frommer Lawrence & Haug LLP; William S. Frommer; Hans R. Mahr

(57) ABSTRACT

A data reproducing apparatus characterized by comprises a data accumulation device consisting of a non-linearly accessible recording medium for accumulating data including video data, a plurality of data reproducing device adapted to storing the data read out from said data accumulation device in respective memories, converting said data stored in the memories to a predetermined data format and outputting the data and a control device for allocating time slots to said data reproducing device with a predetermined cycle period and controlling said data reproducing device so as to cause them to read out said data from said data accumulation device and store them in said respective memories in said respective time slots, each of said memories including at least three banks, each having a capacity for storing data for the time slots of each said predetermined cycle period, said control device assigning to the data reproducing device operating for variable speed replaying the time slots to be allocated to the remaining data reproducing device.

24 Claims, 18 Drawing Sheets

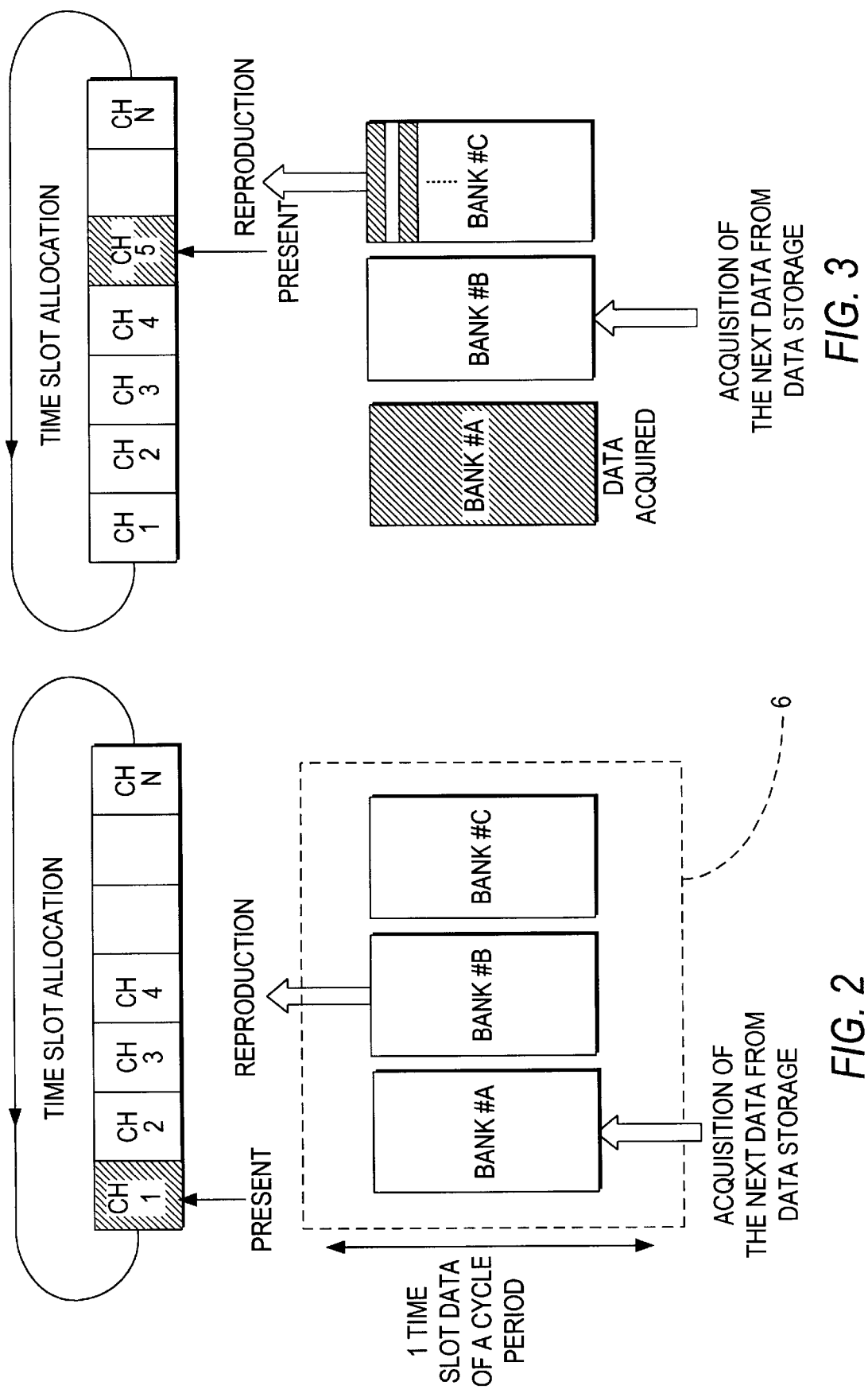

DATA REPRODUCTION USING TIME SLOT ALLOCATION

BACKGROUND OF THE INVENTION

1. Field of the Invention

This invention relates to a data reproducing apparatus and also to a data reproducing method. More particularly, it relates to a data reproducing apparatus to be suitably used for an AV server in a broadcasting station.

2. Description of the Prior Art

The increased number of channels that have become available for accessing to various types of information due to, if partly, the development of CATV (cable television) in recent years has by turn given rise to a strong demand for novel audio/video data recording/reproducing apparatus adapted to recording and reproducing different sets of audio/video data concurrently with a single apparatus. As a matter of fact, apparatus referred to as a video server (or an AV (audio and/or video) server) and adapted to concurrently recording different sets of audio/video data in and also reproducing such data from randomly accessible recording means such as hard disks have getting popularity to meet this demand.

Generally, a video server installed in a broadcasting station is required to show a high data transfer rate and have a huge recording capacity in order to meet various requirements including a high image and sound quality and a long recording time. Thus, attempts have been made to produce a high data transfer rate and a high recording capacity by introducing a data recording/reproducing apparatus capable of dealing with a plurality of hard disks (hereinafter referred to as HD) units concurrently and storing parity data in the apparatus in advance so that the overall reliability of the apparatus may be maintained if one or more than one of the HD units fail. With such an arrangement, it is possible to realize a multi-channel video server adapted to a variety of applications such as VOD (video on demand) and NVOD (near video on demand) systems, where same source data comprising a plurality of different sets of audio/video data are recorded in a distributed fashion and then reproduced simultaneously or with slight time differences before they are transmitted through a multiple of channels.

The data recording/reproducing apparatus used in such a video server is based on the RAID (redundant arrays of inexpensive disks) technology of utilizing a plurality of hard disk drives (hereinafter referred to as HDDs), each being adapted to drive a plurality of hard disks, as described in Patterson et al. ("A Case for Redundant Arrays of Inexpensive Disks (RAID)", ACM SIGMOND Conference, Chicago, Ill., Jun. 1–3, 1998.)

According to the above paper, the RAID technology may be classified into five categories, RAID-1 through RAID-5. Category RAID-1 used to write same data in a pair of HDDs. With Category RAID-3, the input data are divided into groups of data having a predetermined length and recorded in a plurality of HDDs, while a parity data is generated as exclusive OR of the corresponding data blocks of each HDD and written in another HDD. With Category RAID-5, on the other hand, data are divided into large units (blocks) and the data of each unit are recorded in an HDD as data block, while the outcome of exclusive OR (a parity data) of the corresponding data blocks of each HDD is recorded in other HDDs as a parity block in a distributed fashion.

For the remaining aspects of RAID, reference should be made to the above identified paper.

An AV server as described above comprises a data storage consisting of a plurality of hard disks for storing AV data, a plurality of AV data input/output interfaces (hereinafter referred to as ports) for inputting AV data into and outputting such data from the data storage and a system controller for controlling the operation of the entire system. Each port has a memory for regulating the timing of retrieving out AV data from and that of storing AV into the data storage. Then, an AV server having the above described configuration performs processing operations concurrently for a multiple of channels as the system controller controls the ports in such a way that they are used evenly and cyclically on a time division basis with a predetermined period. More specifically, each port processes AV data for a single channel on a time division basis so that, as a result, AV date are processed for all the channels simultaneously by the ports, the number of which is equal to that of the channels. Therefore, with such an AV server, time slots are allocated to the ports of the multiple of channels periodically in a rigid fashion. Then, as a general practice, the length of each time slot is made as short as possible in order to minimize the queuing time of each port, provided that the time length required for each port to read and reproduce a given volume of data from the memory at an ordinary rate is secured.

An AV server used by professionals in broadcasting stations and other similar facilities are required by necessity to show a quick responsiveness particularly in the initial stages of the AV data reproducing operation. Additionally, since AV data will have to be reproduced with variable speed for frequent high speed or reversal replaying in AV data editing sessions, a quick responsiveness and an enhanced operability are essential particularly when the replay speed has to be accelerated for a shift from normal speed to high speed or vice versa and when the current forward replaying has to be switched to backward replaying or vice versa. More specifically, when an command is given for a replay speed change, such a change has to take place very smoothly in producing the specified speed and/or running direction without giving rise to the effect of a slow-speed film.

However, with the known AV server, the length of each time slot is defined by referring to the normal replay speed and hence they are accompanied by the following problems when they are used for variable speed.

For example, in a known AV server provided 10 ports and hence adapted to perform input/output operations through 10 channels, a second is divided into 10 time slots, which are then evenly allocated to the 10 channels so that AV data for a second (30 frames) are read out in a time slot. However, the operation of reading out data at such a rate is insured only when the hard disk from which it is reading out data has a continuous recording area or several distributed areas at most for a second of operation so that the operation can proceed effectively at least for a second for reading out the specified contents.

Thus, with such a known AV server, storage areas on the currently active hard disk have to be accessed discontinuously in a high speed AV data reproduction mode of operation so that a large portion of the time dedicated to the data reproducing operation is actually consumed for the accessing process at the cost of the time necessary for reading data. More specifically, when reading AV data from the hard disk for frames selected for high speed replaying as a function of the required magnification ratio of replay speed, distributed areas have to be accessed on a frame by frame basis so that consequently AV data for only two or three frames can be read out in a single time slot in the worst case where the time is mostly consumed for seek operations.

Therefore, the above described time slot allocation scheme is not very effective and the volume of AV data that can be read out in a single time slot is reduced from the intended volume of data good for 30 frames to the volume of data good for only two or three frames. The net result is that the number of data sheets reproduced per unit time is reduced significantly particularly during high speed data reproducing operations so that images may be displayed like those of a slow-speed film and the operation of searching out any wanted image can become very cumbersome in the editing session.

Secondly, such a known AV server cannot respond to a command for an operation of accelerating from normal replaying to high speed replaying, decelerating from high speed replaying to normal replaying or reversing the reproducing direction issued by way of the control panel until the next time slot allocated to the related channel comes to make the system rather clumsy and inefficient.

SUMMARY OF THE INVENTION

In view of the above identified problems and other problems, it is therefore the object of the present invention to provide a data reproducing apparatus and a data reproducing method that can reproduce images in a variable speed replay mode by quickly realizing the specified speed and/or direction of replaying operation, be it high speed replaying, acceleration, deceleration or reversing, without giving rise to the effect of slow-speed film.

According to the first aspect of the invention, there is provided a data reproducing apparatus characterized by comprising:

a data accumulation means consisting of a non-linearly accessible recording medium for accumulating data including video data;

a plurality of data reproducing means adapted to storing the data read out from said data accumulation means in respective memories, converting said data stored in the memories to a predetermined data format and outputting the data; and a control means for allocating time slots to said data reproducing means with a predetermined cycle period and controlling said data reproducing means so as to cause them to read out said data from said data accumulation means and store them in said respective memories in said respective time slots;

each of said memories including at least three banks, each having a capacity for storing data for the time slots of each said predetermined cycle period;

said control means assigning to the data reproducing means operating for variable speed replaying the time slots to be allocated to the remaining data reproducing means.

According to the second aspect of the invention, there is provided a data reproducing method for a plurality of data reproducing means to read data from a non-linearly accessible recording medium, store them in respective memories of said data reproducing means and convert them to a predetermined format before outputting them in the respective allocated time slots, comprising:

a first step of assigning to the data reproducing means operating for variable speed replaying the time slots to be allocated to the remaining data reproducing means; and a second step of causing said data reproducing means to read out data corresponding to the time period of said assigned plurality of time slots from said recording medium in the assigned time slots of said predetermined cycle period and store them in said memory.

According to the third aspect of the invention, there is provided a data reproducing apparatus characterized by comprising:

a data accumulation means consisting of a non-linearly accessible recording medium for accumulating data including video data;

a plurality of data reproducing means adapted to read data from said data accumulation means, store said data into one of at least three banks constituting each of the memories belonging respectively to said data reproducing means and output the stored data in allocated time slots; and a control means for allocating time slots to said data reproducing means;

upon receiving a control command for double speed replaying, the data reproducing means with the received control command reading out data corresponding to the time period of said allocated time slots of a predetermined cycle period from said data accumulation means in the closest one of the time slots allocated by said control means, thinning out said data so as to be output continuously during the time period down to the third time slot allocated by said control means to the data reproducing means with the received control command, if said first time slot not being the time slot allocated to any of the remaining data reproducing means in the time slot cycle period of receiving said control command, and outputting said thinned out data from said first bank;

said control means assigning said second time slot to be allocated to any of the remaining data reproducing means during said time period from said first time slot to said third time slot to said data reproducing means with the received control command.

According to the fourth aspect of the invention, there is provided a data reproducing method for a plurality of data reproducing means to read out data from a non-linearly accessible recording medium in the respective time slots allocated to them, storing them into one of at least three banks constituting each of the memories belonging respectively to said data reproducing means and outputting the stored data, comprising:

a first step of reading out data corresponding to the time period of said allocated time slots of a predetermined cycle period in the closest first one of the time slots allocated to the data reproducing means receiving a control command for double speed replaying and storing the data in the first bank of the memory of said data reproducing means;

a second step of thinning out said data so as to be output continuously during the time period down to the third time slot allocated by said control means, if said first time slot not being the time slot allocated to any of the remaining data reproducing means in the time slot cycle period of receiving said control command, and outputting said thinned out data from said bank;

a third step of assigning the second step to be allocated to any of the remaining data reproducing means during said time period from said first time slot to said third time slot to said data reproducing means with the received control command; and a fourth step of storing said data corresponding to the time period of said time slots of a predetermined cycle period into the second bank of said memory and outputting said data for said double speed replaying in the time slot assigned in said third step.

According to the fifth aspect of the invention, there is provided a data reproducing apparatus characterized by comprising:

a data accumulation means consisting of a non-linearly accessible recording medium for accumulating data including video data;

a plurality of data reproducing means adapted to read data from said data accumulation means, store said data into one of at least three banks constituting each of the memories belonging respectively to said data reproducing means and output the stored data in allocated time slots; and a control means for allocating time slots to said data reproducing means;

upon receiving a control command for reversing the replaying direction, the data reproducing means with the received control command outputting the data stored in the first bank of said memory in the reverse direction during the time period down to second time slot allocated to said data reproducing means and destructing the data stored in the second and third banks of said memory, thereby reading out data corresponding to the time period of the time slots of a predetermined cycle period continuously from said recording medium in the closest first time slot assigned to said data reproducing means with the received control command from the time of receiving said control command in the direction reverse to that of said data output from said first bank and storing said data into the second bank.

According to the sixth aspect of the invention, there is provided a data reproducing method for a plurality of data reproducing means to read data from a non-linearly accessible recording medium, store them in respective memories of said data reproducing means and convert them to a predetermined format before outputting them in the respective allocated time slots, characterized by comprising;

a first step of, upon receiving a control command for reversing the replaying direction, outputting the data stored in the first bank of the memory of the data reproducing means with the received control command in the reverse direction during the time period down to second time slot allocated to said data reproducing means;

a second step of destructing the data stored in the second and third banks of said memory;

a third step of reading out data corresponding to the time period of the time slots of a predetermined cycle period continuously from said recording medium in the closest first time slot assigned to said data reproducing means with the received control command from the time of receiving said control command in the direction reverse to that of said data output from said first bank and storing said data into the second bank; and a fourth step of outputting said data stored in said second bank at a rate showing the magnification ratio of replay speed specified by said control command.

As described in detail above, with a data reproducing apparatus according to the invention, it is possible for one of its data reproducing means to read data from a continuous region of the data accumulation means for a data reproducing operation in a variable speed replay mode when the volume of image data that can be read out of the data accumulation means is raised. As a result, when said one of the data reproducing means is operating in a variable speed replay mode to realize the specified speed and/or direction of replaying operation, be it high speed replaying, acceleration, deceleration or reversing, it can effectively read out a large volume of image data from the continuous region by a single access so that it can eliminate unnecessary data by thinning out the read out data without giving rise to the effect of slow-speed film and realize the specified speed and/or direction of replaying operation quickly in order to reproduce images.

Additionally, with a data reproducing method according to the invention, again it is possible for one of its data reproducing means of such a data reproducing apparatus to read data from a continuous region of the data accumulation means for a data reproducing operation in a variable speed replay mode when the volume of image data that can be read out of the data accumulation means is raised. As a result, when said one of the data reproducing means is operating in a variable speed replay mode to realize the specified speed and/or direction of replaying operation, be it high speed replaying, acceleration, deceleration or reversing, it can effectively read out a large volume of image data from the continuous region by a single access so that it can eliminate unnecessary data by thinning out the read out data without giving rise to the effect of slow-speed film and realize the specified speed and/or direction of replaying operation quickly in order to reproduce images.

BRIEF DESCRIPTION OF THE DRAWINGS

FIG. 2 is a schematic illustration of the configuration of the memory of each AV data input/output interface of the AV server of FIG. 1.

FIG. 3 is a schematic illustration similar to FIG. 2, showing how the memory operates for a high speed replaying operation through channel 1.

DETAILED DESCRIPTION OF THE PREFERRED EMBODIMENTS

Figure 1:
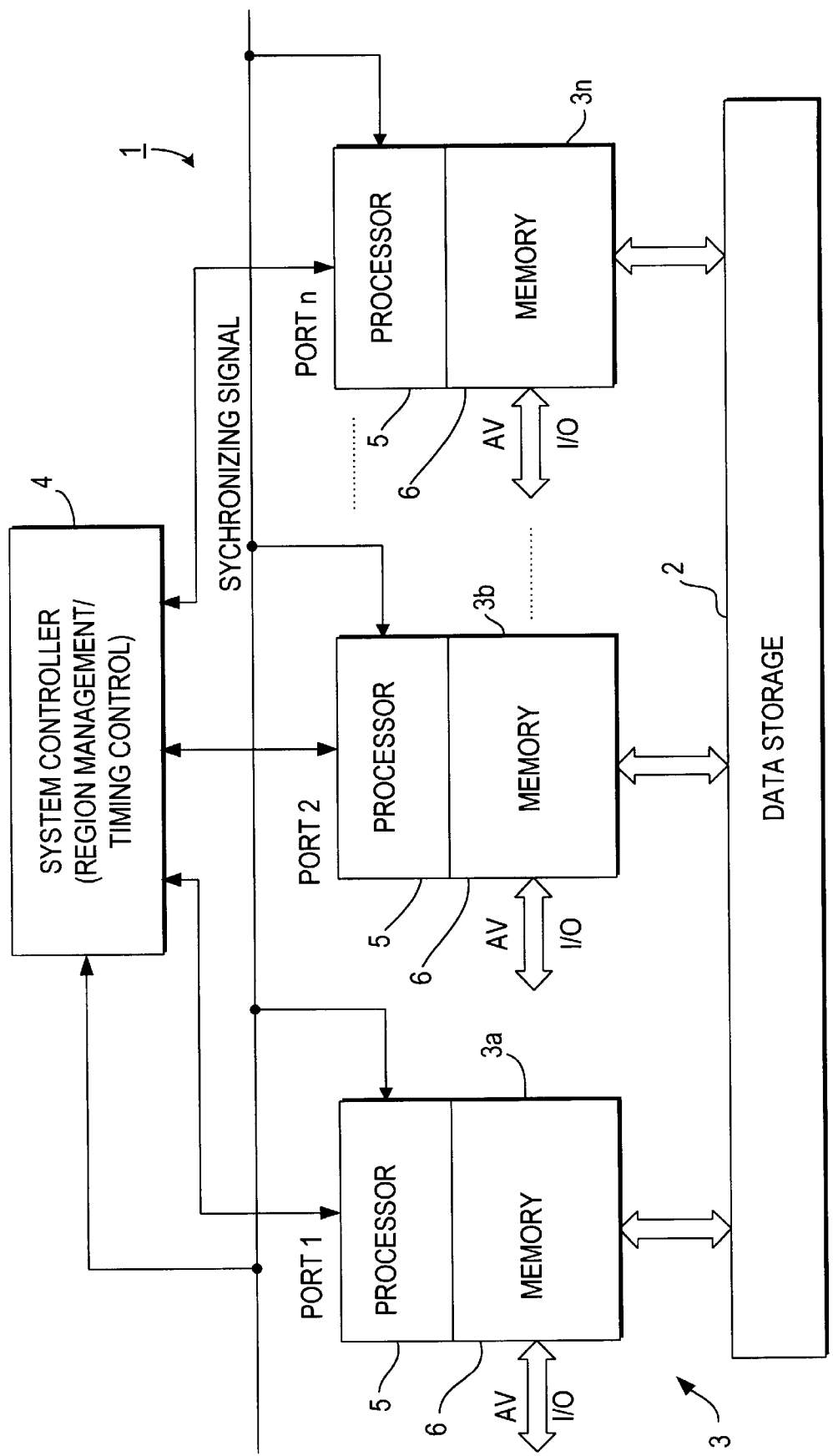
FIG. 1 is a schematic block diagram of an AV server realized by applying the present invention.

Now, the present invention will be described in greater detail by referring to the accompanying drawings that illustrate preferred embodiments of the invention. FIG. 1 is a schematic block diagram of an AV server 1 realized by applying the present invention and adapted to storing, reproducing editing and delivering data including AV data through a plurality of channels, said AV server comprising a data storage 2 for storing AV data, a plurality of AV data input/output interfaces 3 (hereinafter referred to as ports) (3a, 3b, . . . , 3n) to be used for accessing the data storage 2 and a system controller 4 for controlling the overall operation of the system.

The data storage 2 is a disk array unit prepared by arranging a plurality of hard disk drives (HDDs) to produce a RAID (redundant arrays of inexpensive disks) configuration as described earlier by referring to the prior art such that AV data may be read out from or write into predetermined areas of the hard disks independently and concurrently through the respective ports.

As shown in FIG. 1, each of the ports 3 comprises a processor 5 and a memory 6. The processor 5 accesses a predetermined area of the data storage 2 in the time slots allocated to it by the system controller 4. The processor 5 additionally regulates the timing for outputting AV data from or inputting AV data to the data storage 2 by controlling the operation of storing data into or reading out data from the memory 6 in the time slots allocated to is by the system controller 4. As shown in FIG. 2, the memory 6 comprises three banks (Bank #A, Bank #B, Bank #C). Simply for the sake of convenience, the ports 3a, 3b, . . . , 3n will be referred to as port 1, port 2, . . . , port n hereinafter.

In the AV server 1, the system controller 4 allocates to the ports time slots that can be used for accessing the data storage 2 on a time division basis so that the AV data may be accessed concurrently through the n ports for AV data recording or AV data reproducing operations. More specifically, referring to FIG. 2, the system controller 4 uses a cycle period as fixed period and divides it evenly by n, the obtained n time slots being allocated to port 1 through port n on a sequential basis. Therefore, each port is allocated with a time slot in each cycle period, which is equal to 1/n of the period.

From the viewpoint of reproducing AV data, the length of each time slot allocated to a port is so selected that a volume of AV data that may be reproduced continuously within a period from a time slot to the next allocated to it can be stored from the data storage 2 to the memory 6 of that port. Thus, from the viewpoint of port 1, data for a time slot cycle period are stored in Bank B when a time slot is allocated to port 1 and the data stored m Bank B are reproduced the time when a time slot is allocated to port 2. Referring to FIG. 2, then data are stored in Bank A when a time slot is allocated in the next cycle period so that the data in Bank B may be continuously reproduced until the operation of storing data in Bank A terminates. Then, as the time slot of port 2 comes, the operation of reproducing data from Bank 2 is terminated, when an operation of reproducing data stored in Bank A starts.

Thus, in the AV server 1, each memory 6 can output continuously from one of its banks to continue its data reproducing operation until the next time slot of the port itself hereinafter referred to as own time slot) is allocated.

For recording data into the data storage 2, on the other hand, the above processing procedures are reversed and a volume of AV data is stored in any of the banks of the memory of the port in each a time slot cycle period and then written into the data storage 2 collectively during the time slot allocated to the port. Thus, from the viewpoint of recording AV data, the length of a time slot cycle period is so selected that a volume of AV data necessary or an ordinary data reproducing operation can be read out and stored in one of the banks of the memory 6 during that period, although the length has to be made as short as possible.

The system controller 4 controls the processor 5 of each port according to the input/output control signal fed from a control panel (not shown) or some other signal source. The input/output control signals that the processor 5 receives contain commands for normal data recording and reproduction, stopping the data recording/reproducing operations, slow data reproduction, high speed data reproduction, reversal replaying as well as additional information such as information on the replaying magnification ratio for high speed data reproduction with variable speed.

The processor 5 of each port carries out its AV data recording/reproducing operation under the control of the system controller 4 in a manner as described below. For recording data, the processor 5 converts the AV data fed from an external block into a data format good for recording them into the hard disks of the data storage 2 and compresses them, if necessary, before it stores the processed data into the banks of the memory 6 sequentially. When an own time slot is assigned to it, it then transmits the data to the data storage 2 and records the data there. Techniques that can be used for the compression include the MPEG and JPEG systems that utilize inter-frame relations and the DV system that utilizes intra-frame compression. Data input from the outside are typically provided in the SDI (Serial Data Interface) format standardized according to SMPTE-259M or SDTI (Serial Data Transfer Interface) format standardized according to SMPTE-305M. The processor 5 takes out AV data in such a format.

For reproducing data from the data storage 2, the processor 5 reads out a volume of data good for a time slot cycle period from the data storage 2 when an own time slot is allocated to it and stores the data in any of the banks of the memory 6. If necessary, it then expands the data when the next time slot is allocated to it and converts the data into a format such as SDI or SDTI adapted to outputting the data to the outside before it actually outputs the data, while it reads out a volume of data good for another time slot cycle period from the data storage 2 and stores the data in any of the remaining banks of the memory 6. Besides the above listed SDI and SDTI formats, data formats to be used for outputting data to and inputting data from the outside include Fibre Channel and ATM (Asynchronous Transfer Mode).

Additionally, when any of the ports shifts its operation to a variable speed replay mode such as high speed replaying, accelerating or decelerating the replay speed or reversal replaying, the system controller 4 of the AV server 1 takes up the time slots of idle ports and assigns them to the port operating in a variable speed replay mode.

Figure 4:
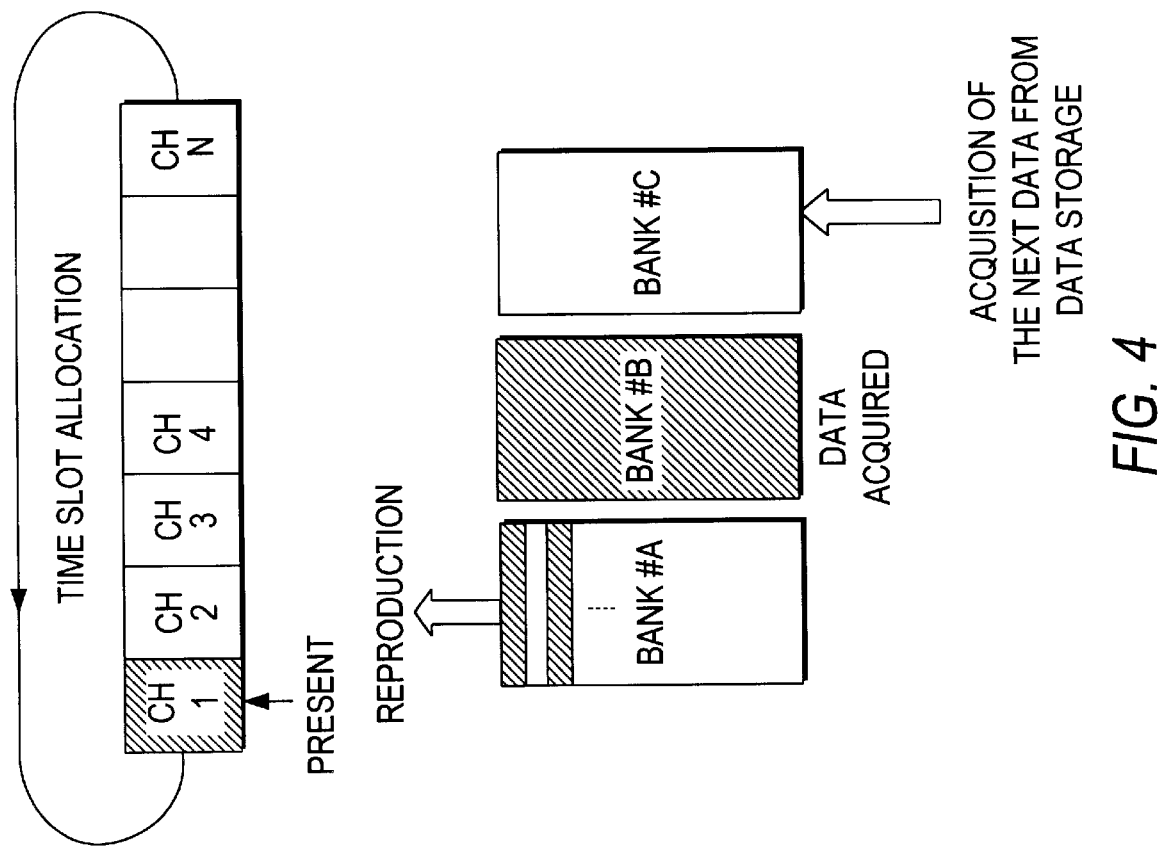
FIG. 4 is a schematic illustration similar to FIG. 2, also showing how the memory is used for a high speed replaying operation through channel 1.

Assume here, for example, that port 1 operates for high speed replaying and the system controller 4 detects an idle channel. Then, as shown in FIGS. 3 and 4, the system controller 4 gives the time slot of channel 5 that is an idle channel to port 1. Thus, port 1 can now read out data good for two time slots, the own time slot and the given time slot, from the data storage 2 and stores them into two of the banks of the memory 6. When the sorted data are output from the two banks, they are thinned out to reflect the magnification ratio of the specified replay speed so that the data may be reproduced at the specified replaying speed.

Thus, in the AV server 1 that is controlled in a manner as above described, data can be read out from a continuous region on any of the hard disks of the data storage 2 to avoid a situation where discontinued and isolated areas have to be accessed and consequently only an insufficient volume of data is read out. In other words, data can be reproduced effecively and smoothly with the specified replay speed without giving rise to the effect of a slow-speed film.

For the convenience of explanation, assume hereinafter that the AV server 1 comprises a total of 8 ports (8 channels) and each time slot cycle period is divided into 8 time slots and that a volume of AV data good for 32 frames will be reproduced from the AV server 1 in a time slot cycle period with the normal replay speed, or a magnification ratio of 1.

Figure 5:
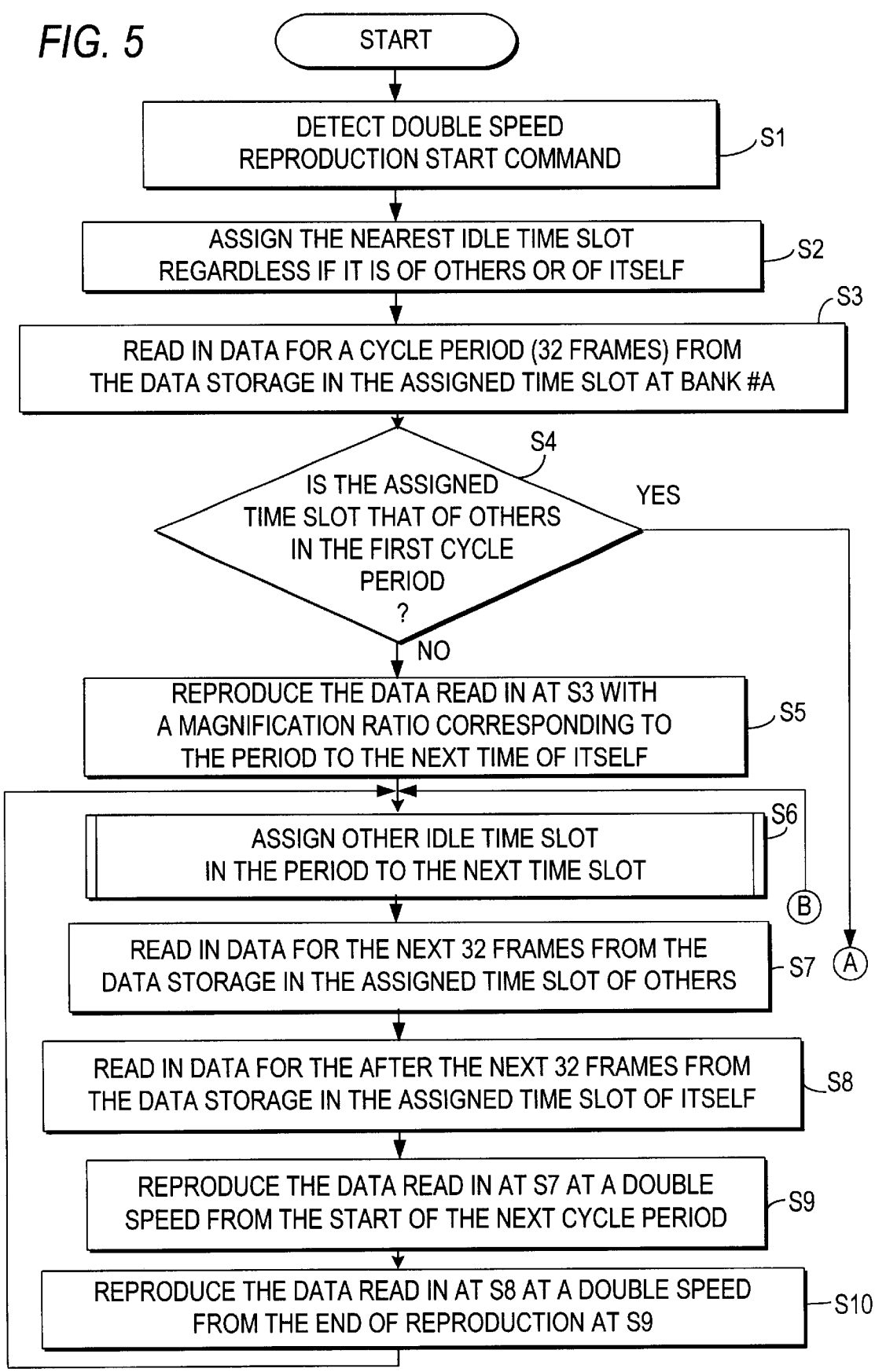
FIG. 5 is a flow chart illustrating a double speed replaying operation.
Figure 6:
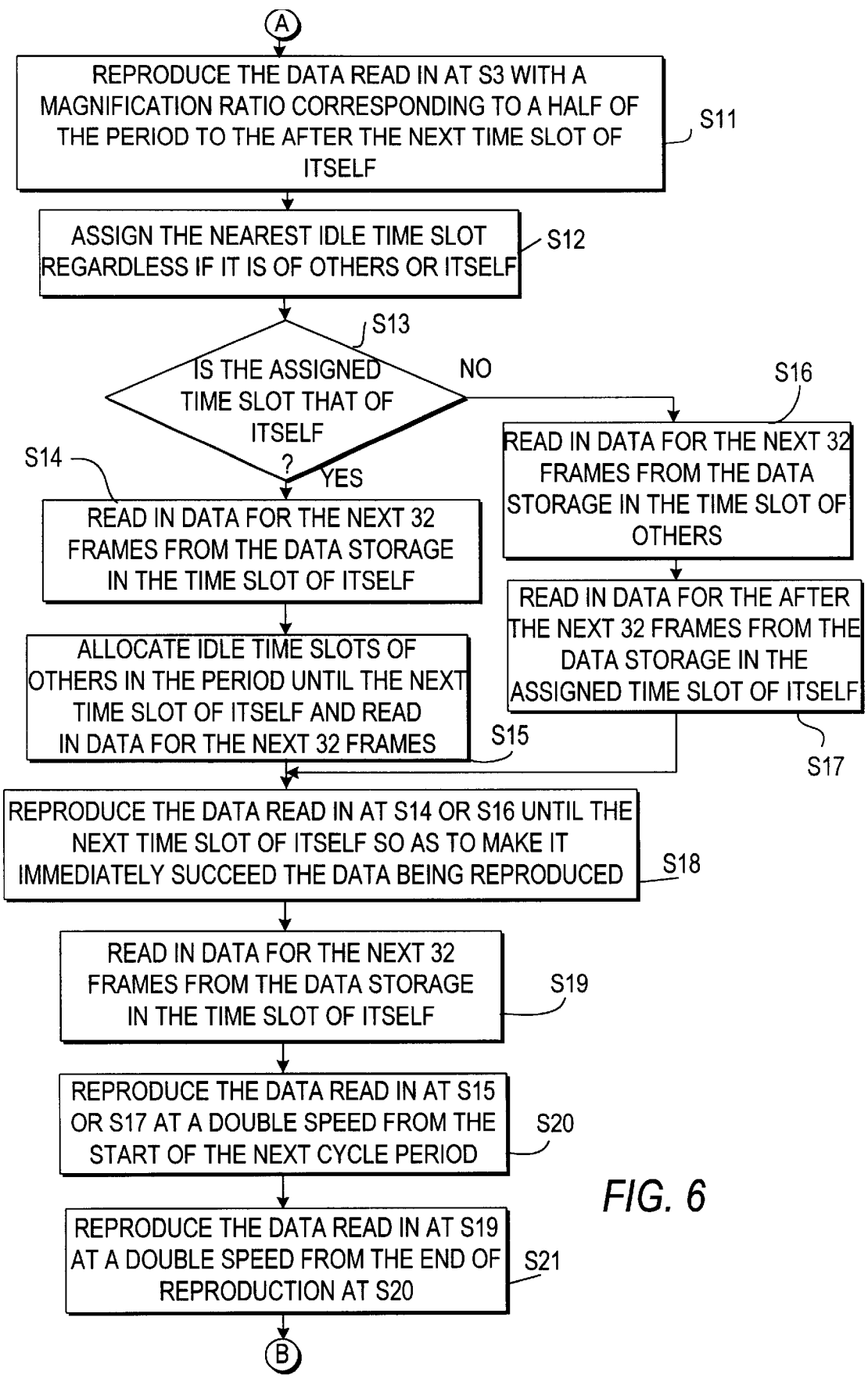
FIG. 6 is a flow chart also illustrating a double speed replaying operation.
Figure 7A:
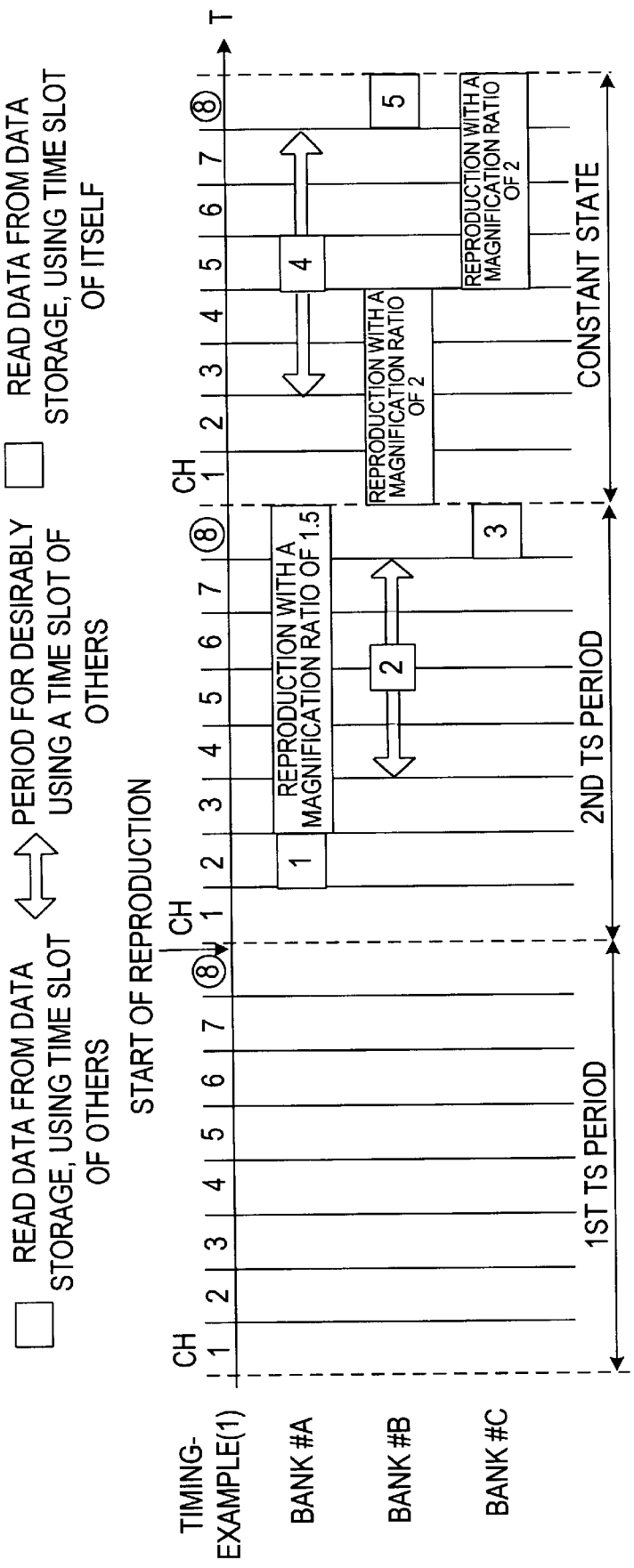
FIGS. 7A–7D are timing charts showing specific examples of timings for a double speed replaying operation through channel 8.
Figure 7B:
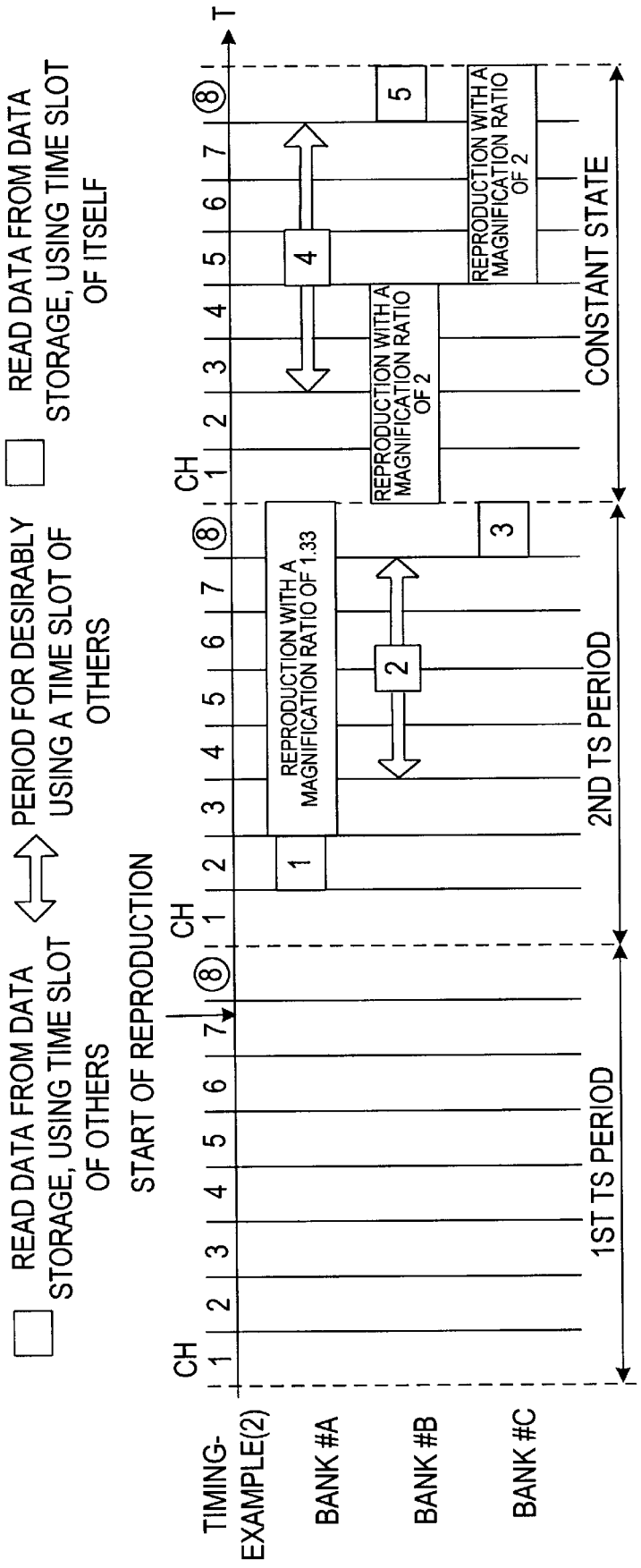
Figure 7C:
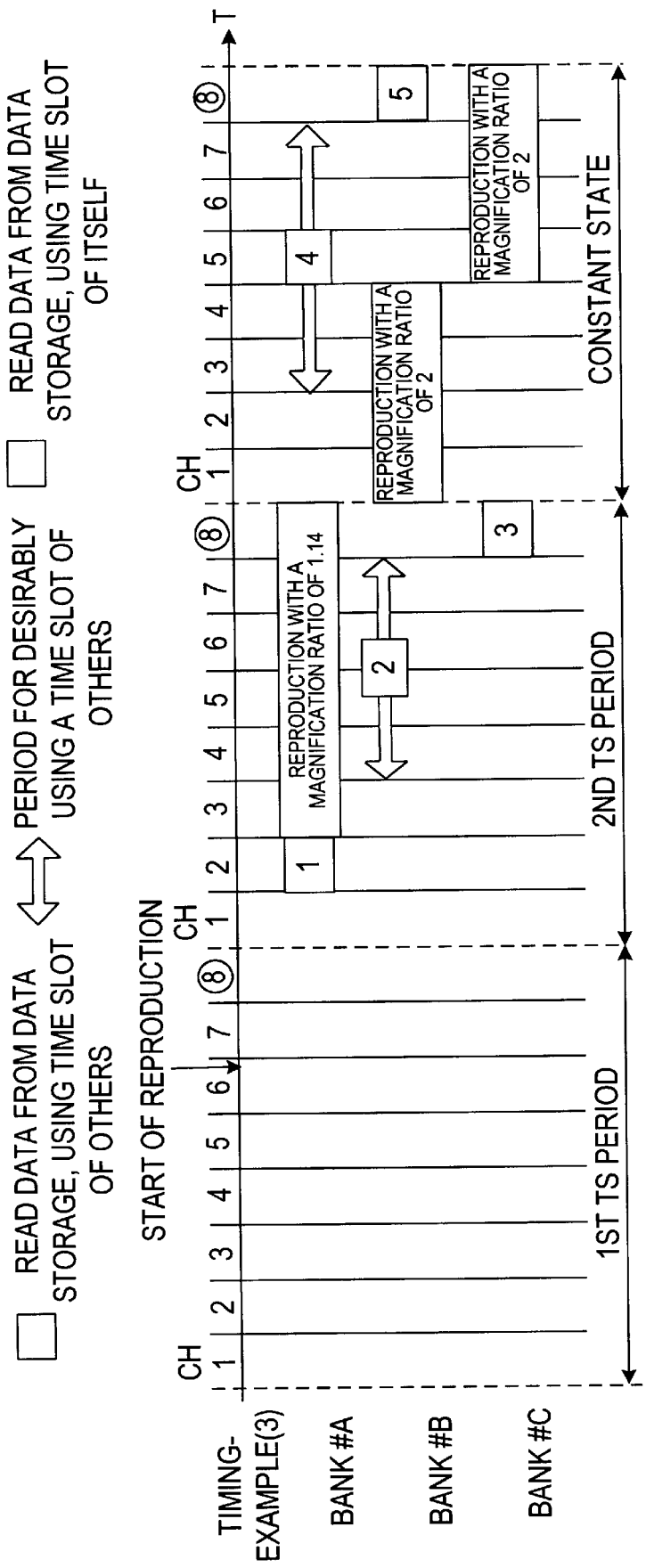
Figure 7D:
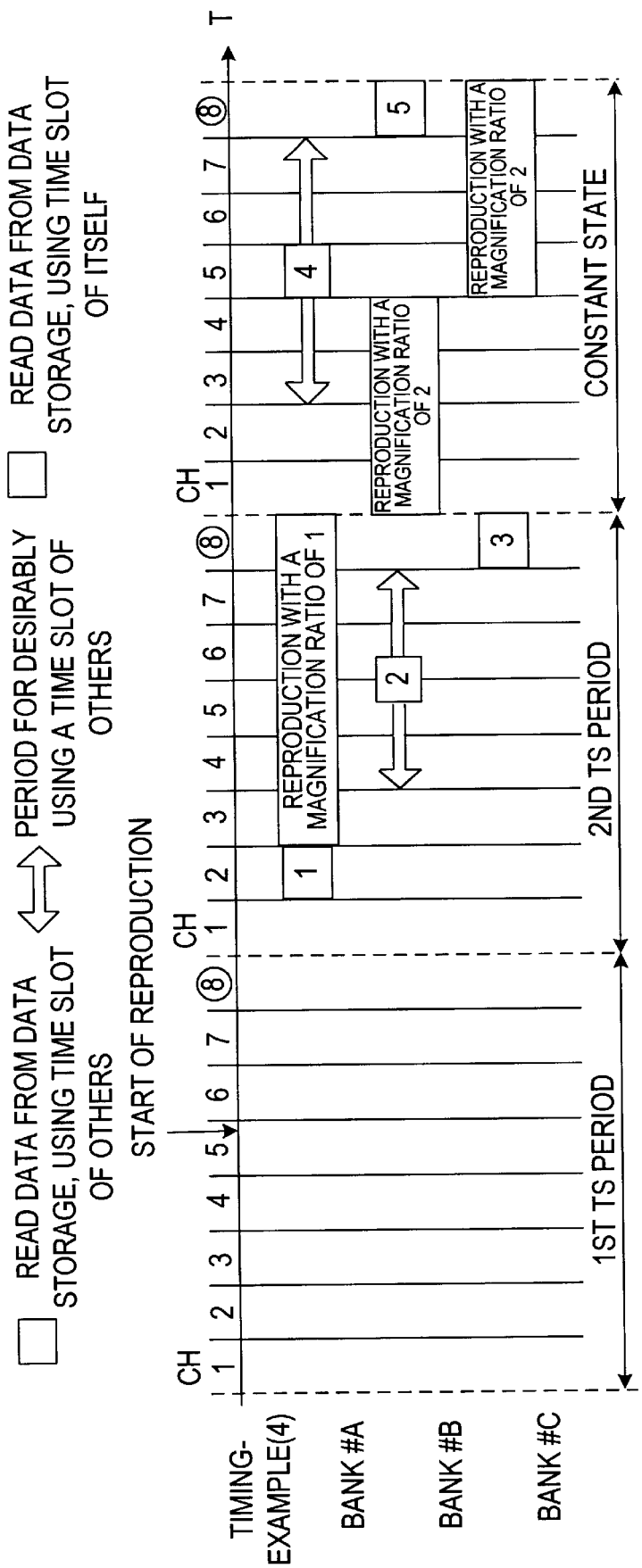
Figure 8A:
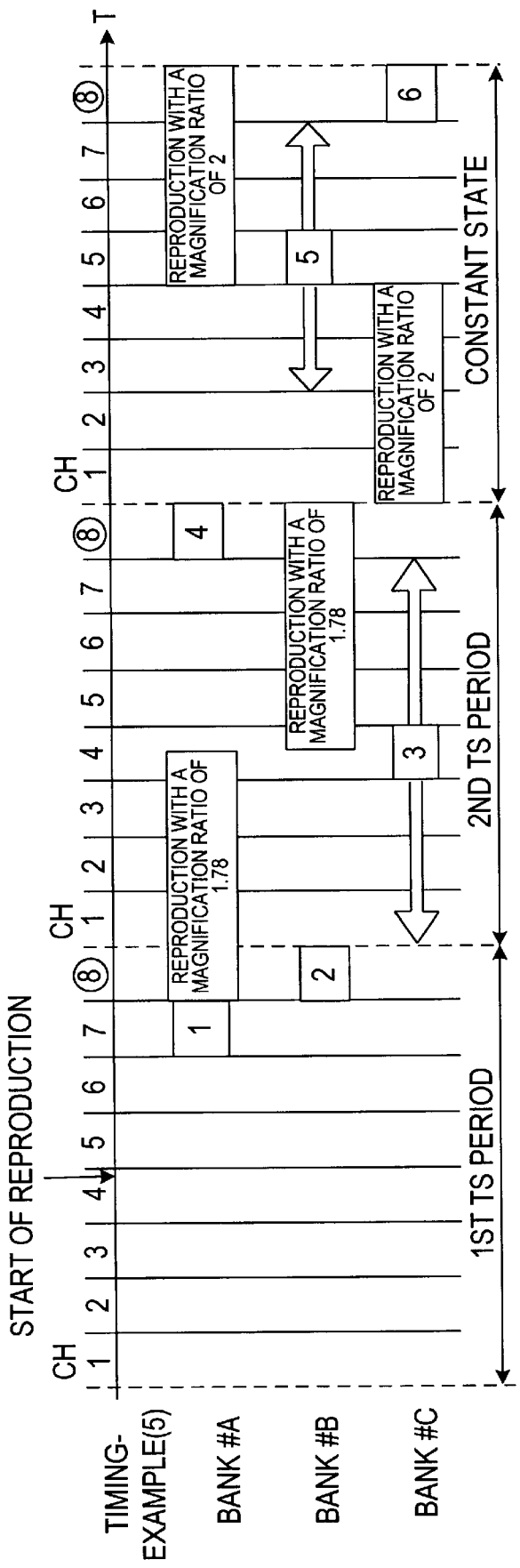
FIGS. 8A–8D are timing charts also showing specific examples of timings for a double speed replaying operation through channel 8.
Figure 8B:
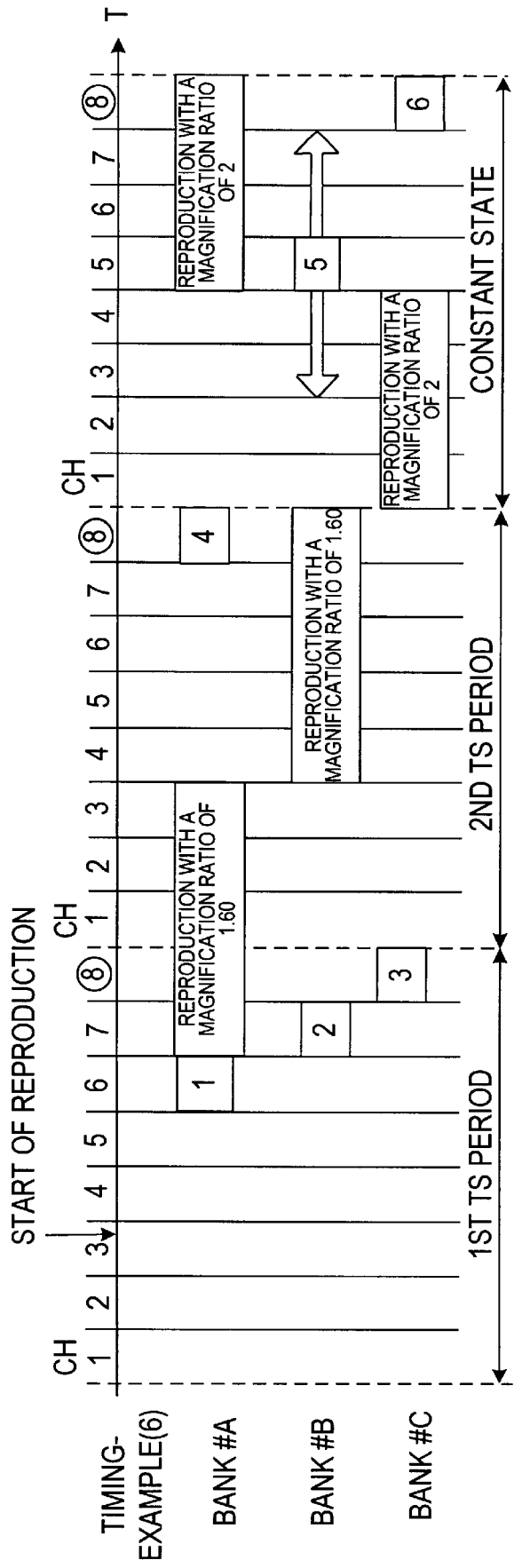
Figure 8C:
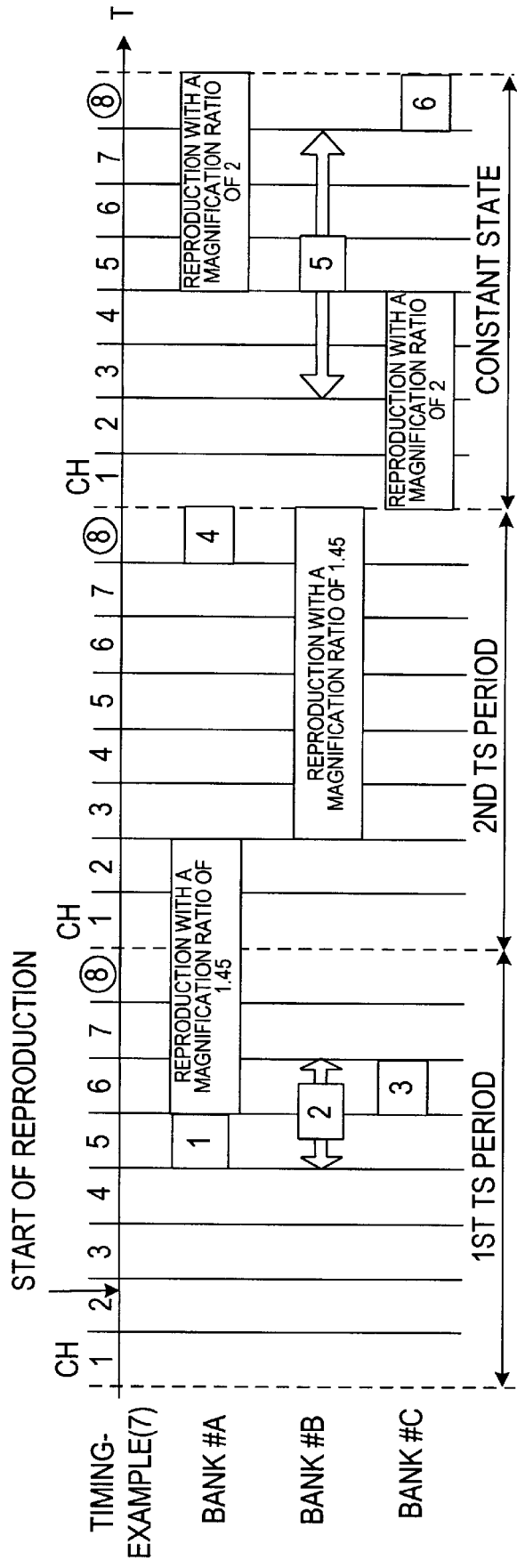
Figure 8D:
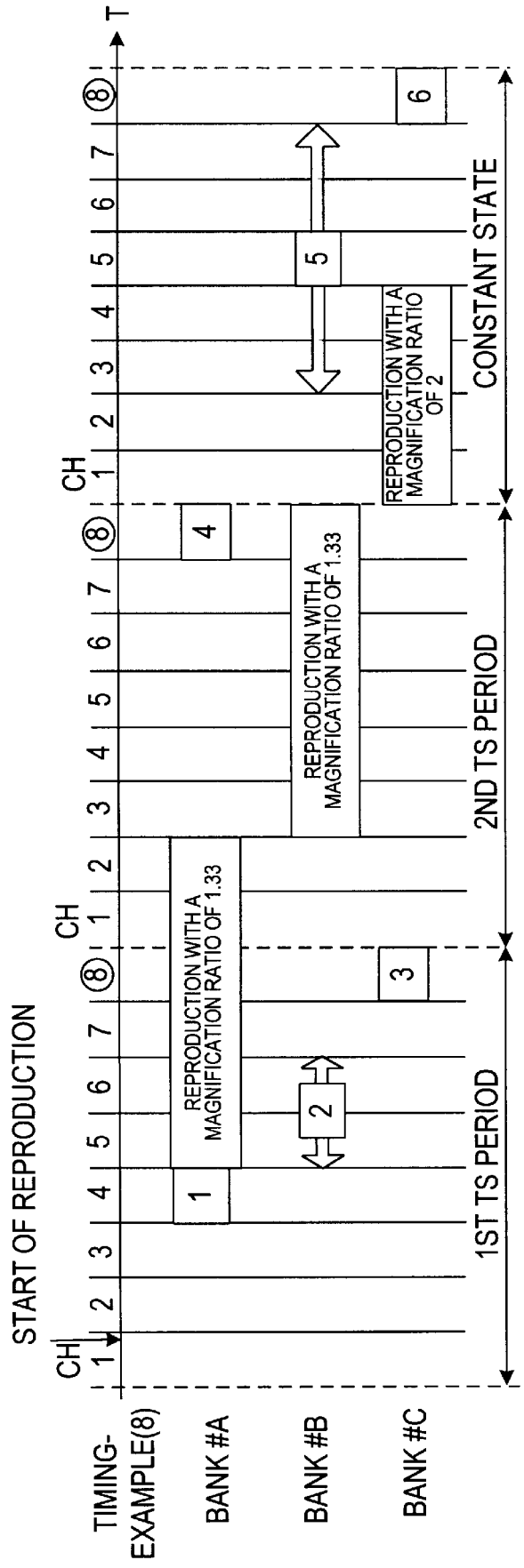

Now, the control procedures for various operations in a variable speed replay mode will be described. FIGS. 5 and 6 are flow charts for double speed replaying, whereas FIGS. 7 and 8 are exemplary timing charts that can be used at the port 8 for double speed replaying.

Upon detecting in Step S1 a double speed replay start command issued to any of the ports, the system controller 4 assigns in Step S2 the closest idle time slot to the port regardless if the idle time slot is an own time slot of the port or a time slot of others. Note that, in this embodiment, the closest time slot, or the earliest time slot, that can be assigned to a busy port after the detection of a replay start command comes only after the first two time slots as indicated by (a) through (d) of FIG. 7 and (1) through (d) of FIG. 8 because firstly a read command is issued to initiate reading data from the data storage 2.

Then, in Step S3, a volume of data good for a time slot cycle period (for 32 frames from, for example, frame 1 to frame 32) is read out from the data storage 2 in the allocated time slot and stored in the bank A of memory 6. Then, the operation proceeds to Step S4.

In Step S4, the system controller 4 determines if the time slot assigned in Step S2 is a time slot of others in the first time slot cycle period or not. The first time slot cycle period as used herein refers to the time slot cycle period in which the replay start command is detected as shown in FIG. 7 and 8 (which is the period from the time when the own time ends and the next time slot starts to the time when the next time own time slot ends). If the system controller 4 determines that the time slot assigned in Step S2 is a time slot of others, or in any of the cases indicated by (a) through (d) in FIG. 8, the operation proceeds to Step S11 of FIG. 6. If, on the other hand, the system controller 4 determines that the time slot assigned in Step S2 is an own slot (or in the case indicated by (d) in FIG. 7) or a time slot of others in the time slot cycle period next to the first time slot cycle period (or in any of the cases indicated by (a) through (c) in FIG. 7), the operation proceeds to Step S5 of FIG. 5.

In Step S5, the data read out in Step S3 is reproduced at a rate showing a magnification ratio corresponding to the time period down to the next own time slot. Thus, with the timing indicated by (a) in FIG. 7, a volume of data good for 8 time slot (32 frames) if reproduced at the normal replay speed will be reproduced within the period of 5 time slots. In other words, the initial replay speed will be 8/5=1.6 times of the normal replay speed. For a replaying operation with 1.6 times of the normal replay speed, data will be thinned out at regular intervals to exclude a volume of data corresponding 12 frames. For example, frames 2, 5 8, 11, 14, . . . may be excluded out of the 32 frames.

Likewise, with the timing indicated by (b) in FIG. 7, the replay speed will be about 1.33 times of the normal replay speed (and data for 8 frames will be excluded) and with the timing indicated by (c) in FIG. 7, the replay speed will be about 1.14 times of the normal replay speed (and data for 4 frames will be excluded), whereas, with the timing indicated by (d) in FIG. 7, the replay speed will be the normal replay speed (and no data will be excluded). With this control arrangement, the time between the detection of a replay start command and the actual replay start is minimized and made constant without giving rise to the effect of a slow-speed film.

Then, in Step S6, another idle time slot of others is assigned to the port before the next own time slot comes. Note that the number of occasions where a time slots of others is assigned will increase if the initial replay speed is low as seen from (a) through (d) of FIG. 7.

Then, in Step S7, a volume of data good for the next 32 frames (for example, from frame 33 to frame 64) is read out from the data storage 2 in the assigned time slot of others and stored in the bank B of memory 6. Then, the operation proceeds to Step S8.

In Step S8, a volume of data stored in the following 32 frames (for example, from frame 65 to fame 96) is read out from the data storage 2 in the next own time slot.

Then, in Step S9, the data read out in Step S7 are reproduced at double speed from the beginning of the next cycle period. Thus, a double speed replaying operation starts from the beginning of the next cycle period without giving rise to the effect of a slow-speed film.

In Step S10, the data read out in Step S8 are reproduced at double speed from the end of the replaying operation in Step S9. When the double speed replaying speed in Step 10 starts, the system controller 4 returns to Step S6 and repeats the above described processing steps from Step S6 to Step S10. As a result, the double speed replaying operation that is free from the effect of a slow-speed film (or a steady state as shown (a) through (d) of FIG. 7) is maintained.

If, on the other hand, it is determined in Step S4 that the time slot assigned to the port in Step S2 is a time slot of others in the first time slot cycle period, the operation proceeds from Step S11 in a manner as described below by referring to FIG. 6 and (a) through (d) of FIG, 8. In this case, an own time slot comes in the initial stages of the replaying operation as may be clear from (a) through (d) of FIG. 8 so that the control procedures as described below will be followed.

Firstly, in Step S11, the data read out in Step S3 are reproduced with a magnification ratio of replay speed that corresponds to a half of the period down to the own time slot after the next. For example, with the timing of (a) in FIG. 8, the period down to the own time slot after the next is equal to 9 time slots so that the volume of data good for 32 frames stored in Bank A is thinned out (by a volume good for 8 time slots with the normal replay speed) and reproduced within a period of 4.5 time slots. Thus, the initial replay speed will be 8/4.5=about 1.78 times of the normal replay speed and a volume of data good for 14 frames will be excluded.

Likewise, with the timing indicated by (b) in FIG. 8, the replay speed will be about 1.60 times of the normal replay speed (and data for 12 frames will be excluded) and with the timing indicated by (c) in FIG. 8, the replay speed will be about 1.45 times of the normal replay speed (and data for 10 frames will be excluded), whereas, with the timing indicated by (d) in FIG. 8, the replay speed will be about 1.33 times of the normal replay speed (and data for 8 frames will be excluded). With this control arrangement, the time between the detection of a replay start command and the actual replay start is minimized and made constant in AV server 1 without giving rise to the effect of a slow-speed film.

Then, in Step S12, the system controller 4 assigns the closes idle time slot to the port, regardless if the idle time slot is an own time slot of the port or a time slot of others, and proceeds to Step S13.

In Step S13, the system controller 4 determines if the time slot assigned in Step S12 is an own time slot or not. If the as signed time slot is an own time slot, it proceeds to Step S14, whereas, if the assigned time slot is not an own time slot, it proceeds to Step S16. For example, if the timing of (a) in FIG. 8 is used, the processing steps from Step S14 on will be followed, whereas, if the timing of any of (b) through (d) in FIG. 8 is used and an idle time slot of others is found before the next own time slot comes, the processing steps from Step S16 on will be followed.

In Step S14, a volume of data good for the next 32 frames (for example, from frame 33 to frame 64) is read out in the own time slot and stored in the bank B of memory 6. Then, the operation proceeds to Step S8, where, an idle time slot of others is assigned to the port before the next own time slot comes. Then, a volume of data good for the 32 frames after the next (for example, from frame 65 to frame 64) is read out from the data storage 2 in that time slot and stored in Bank C. Then, the operation proceeds to Step S18.

In Step S16, on the other hand, a volume of data good for the next 32 frames (for example, from frame 33 to frame 64) is read out in the time slot of others and stored in the bank B of memory 6. Then, the operation proceeds to Step S17, where a volume of data good for the 32 frames after the next (for example, from frame 65 to frame 64) is read out from the data storage 2 in the next own time slot and stored in Bank C. Then, the operation proceeds to Step S18.

In Step S18, the data stored in Bank B in Step S14 or Step S16 are reproduced. At this time, the operation of data reproduction is started continuously and immediately after the end of the operation of reproducing data from Bank A with a magnification ratio of replay speed (thinning ratio) same as the ratio with which data are reproduced from Bank A. Thus, the operation of reproducing data from Bank B continues until the next own time slot comes.

Then, in Step S19, a volume of data good for the next 32 frames (in this case, from frame 97 to frame 128) is read out from the data storage 2 and stored in one of the banks, (Bank A in this case) in the next own time slot when the data reproducing operation of Step S18 ends.

Then, in Step S20, the data read out in Step S15 or Step S17 are reproduced at double speed from the beginning of the next cycle period. Thus, a double speed replaying operation starts at this time without giving rise to the effect of a slow-speed film.

In Step S21, the data read out in Step S19 are reproduced at double speed from the end of the replaying operation in Step S20. When the double speed replaying speed in Step S21 starts, the system controller 4 returns to Step S6 of FIG. 5 and repeats the above described processing steps from Step S6 to Step S10. As a result, the double speed replaying operation that is free from the effect of a slow-speed film (or a steady state as shown (a) through (d) of FIG. 8) is maintained.

Thus, it will be seen that, when a double speed replay start command is issued to a port of the AV server 1, idle time slots of others can be assigned (borrowed) to the port regardless of the timing of issuance of the command. Then, AV data can be output without waiting for the time when the next own time slot comes to make it possible to quickly get to the specified replay speed without giving rise to the effect of a slow-speed film.

Figure 9:
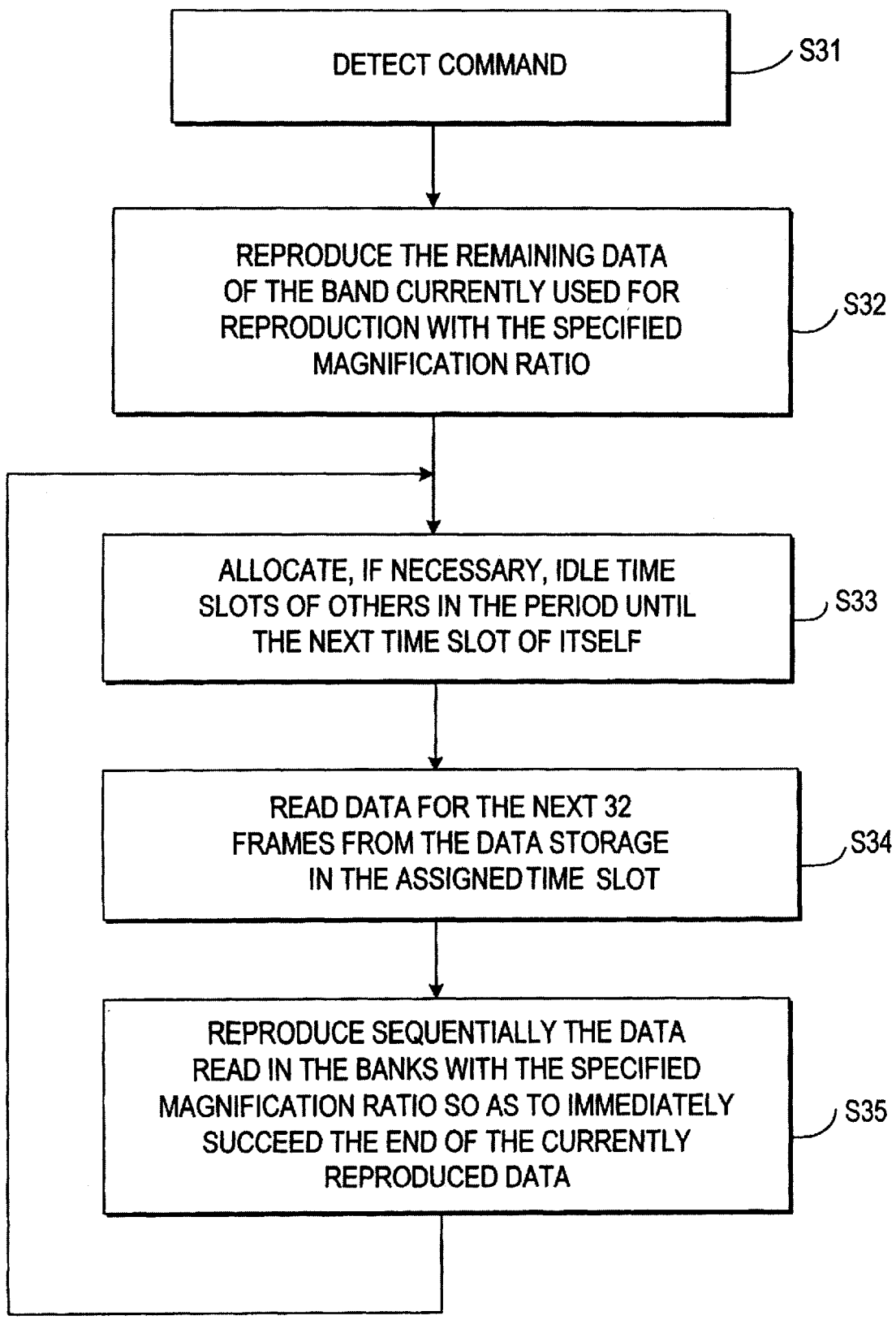
FIG. 9 is a flow chart illustrating an operation of decelerating or accelerating the replay speed.
Figure 10:
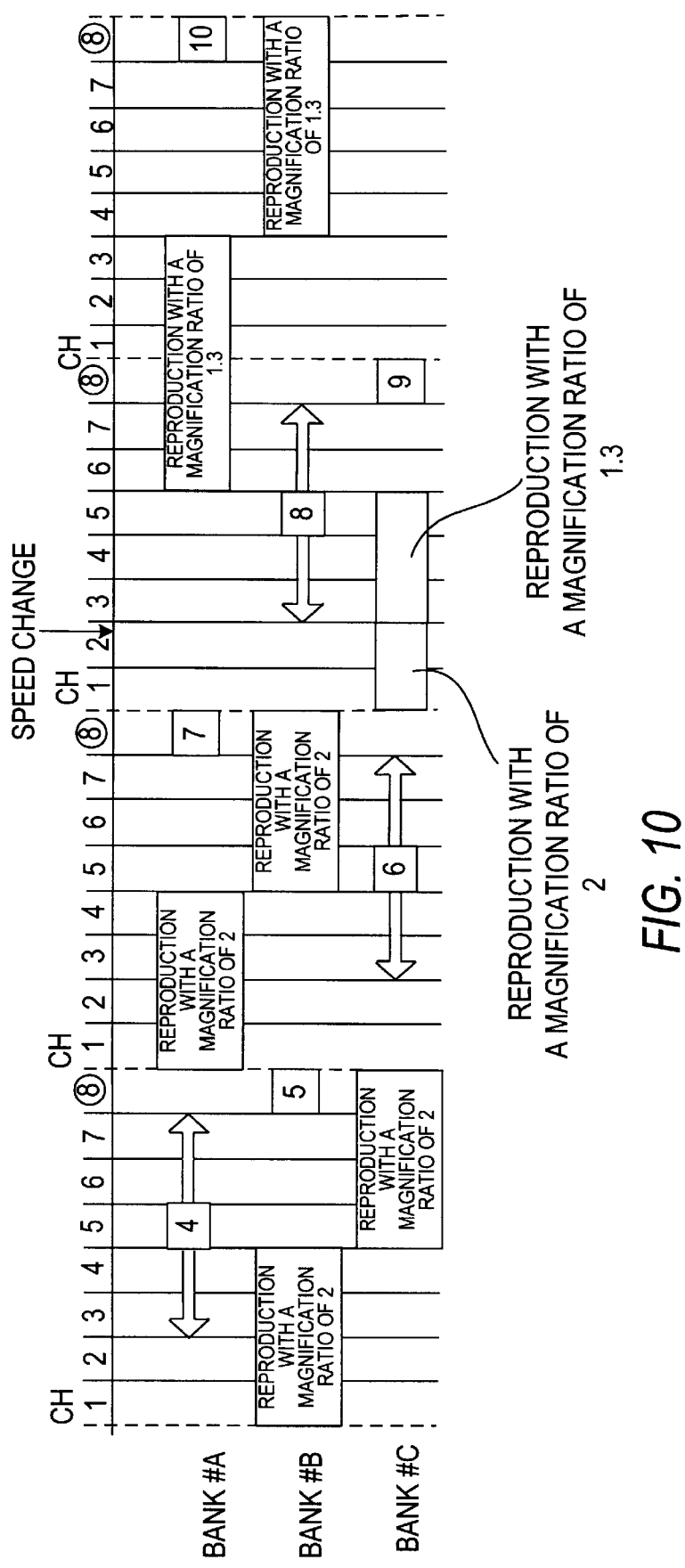
FIG. 10 is a timing chart showing a specific example of reducing the replay speed to a magnification ratio of 1.3 from the steady state of double speed replaying.

Now, the operation of controlling the acceleration or deceleration of the replay speed within a range between the normal speed and the double speed will be described by referring to FIGS. 9 through 11. FIG. 9 is a flow chart illustrating an operation of decelerating or accelerating the replay speed.

Firstly an operation of decelerating the replay speed will be described by referring to FIGS. 9 and 10. FIG. 10 is a timing chart showing a specific example of reducing the replay speed to a magnification ratio of 1.3 from the steady state of double speed replaying.

Upon detecting a speed shift command in Step S31, the system controller 4 reproduces the data remaining in the bank that is currently used for data reproduction (Bank C in FIG. 10) with the specified magnification ratio in Step S32. More specifically, it reproduces the data with the specified magnification ratio from the beginning of the time slot immediately succeeding the time slot when the command is detected. Thus, if, for example, a command for a shift to a speed of 1.3 times of the normal replay speed is detected as shown in FIG. 10, the data reproducing operation at a replay speed equal to 1.3 times of the normal replay speed is started from the beginning of the time slot of port 3.

Then, in Step S33, if necessary, an idle time slot of others is assigned to the port before the next own time slot comes. If no time slot of other is required, the next own time slot will be assigned to the port for the above operation.

In Step S34, a volume of data good for the next 32 frames is red out from the data storage 2 in the time slot assigned in Step S33 and stored in one of the banks (Bank B in the case of FIG. 10) before the system controller 4 proceeds to Step S35.

In Step S35, the data stored in the banks are sequentially reproduced with the specified magnification ratio continuously and immediately after the end of the data that are being currently reproduced. Once the reproducing operation of Step S35 starts, the system controller 4 returns to Step S33 and repeats the above described processing steps from Step S33 to Step S35. As a result, the replaying operation with the specified replay speed that is free from the effect of a slow-speed film is maintained in a steady state.

Figure 11:
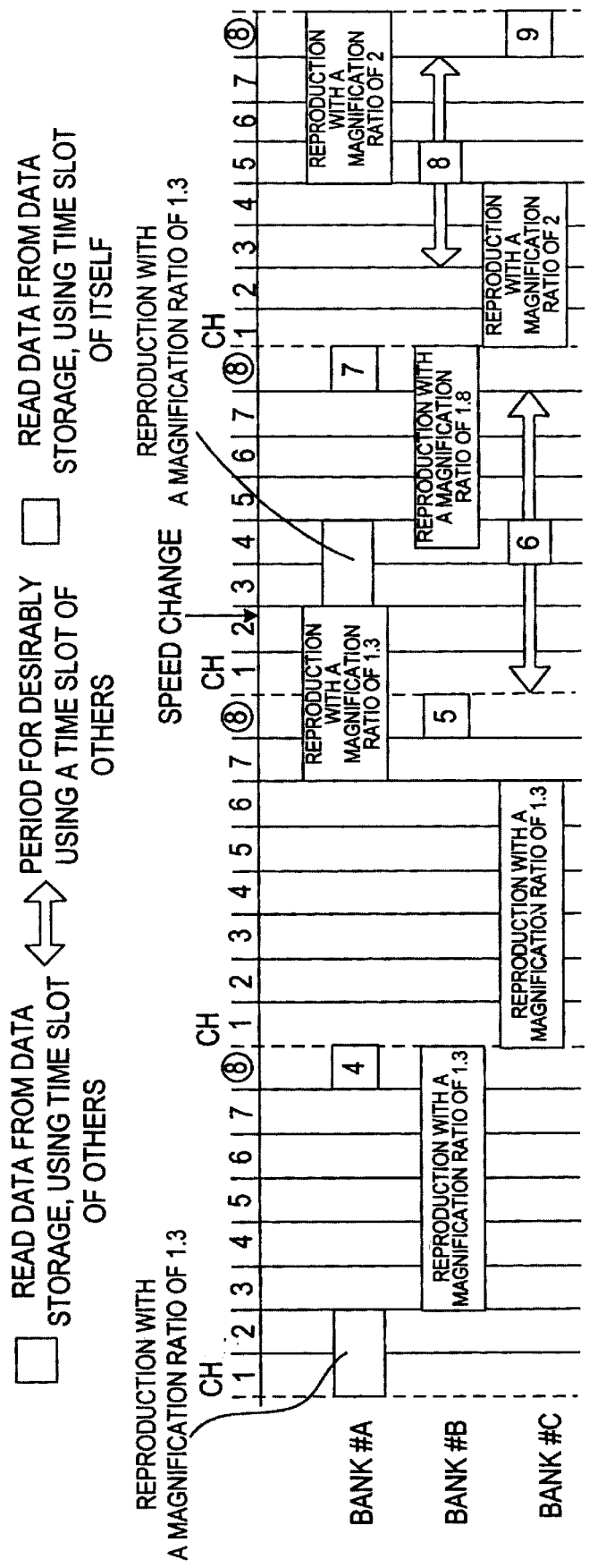
FIG. 11 is a flow chart illustrating the processing operation to be conducted when a command for accelerating the replay speed from a steady state of a magnification ratio of 1.3 to double speed replaying is detected.

FIG. 11 is a flow chart illustrating the processing operation to be conducted when a command for accelerating the replay speed from a steady state of a magnification ratio of 1.3 to double speed replaying is detected. In this case again, it will be seen that the operation of accelerating the replay speed to the specified level can be realized in a stable fashion without the effect of a slow-speed film.

More specifically, upon detecting the command, the operation of shifting the replay speed takes place immediately by following the control procedures illustrated in FIG. 9 without giving rise to the effect of a slow-speed film that can make the editor feel disagreeable.

Figure 12:
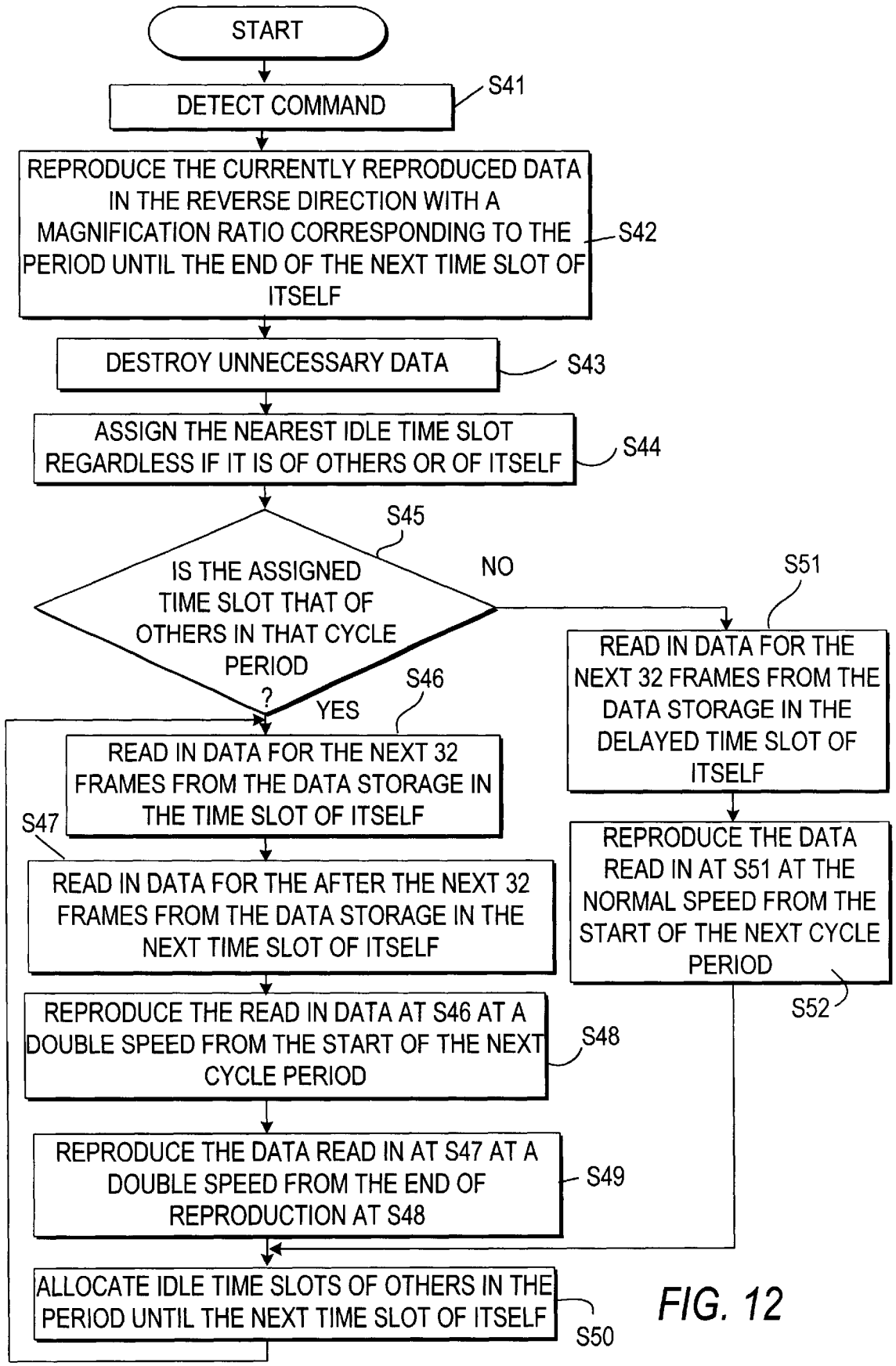
FIG. 12 is a flow chart illustrating the processing operation to be conducted for reversing the replaying direction.
Figure 13:
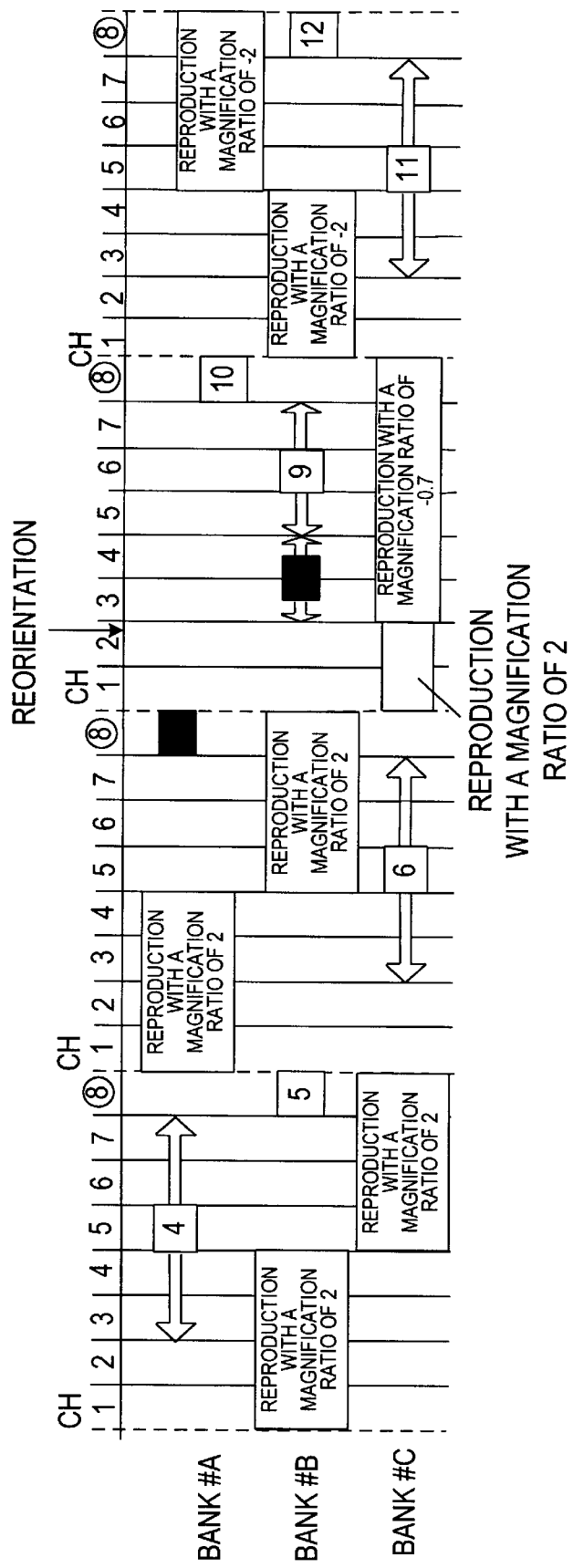
FIG. 13 is a timing chart showing a specific example of reversing the replaying direction.

Now, a reversal replaying operation within a range between the normal speed and the double speed will be described by referring to FIGS. 12 and 13. FIG. 12 is a flow chart illustrating an operation of reversing the replay direction and FIG. 13 is a timing chart showing a specific example of reversing the replay direction.

Firstly upon detecting a command for reversal replaying in Step S41, the system controller 4 calculates the magnification ratio to be used for reversely reproducing the data that are currently being reproduced and also starts the reversal replaying operation in the time period until the next own time slot comes before it proceeds to Step S43. Thus, for example, if a command for reversal replaying is detected in the time slot of port 2 as shown in FIG. 13, a reversal replaying operation will be conducted with a magnification ratio of 0.7 during the period from the beginning of the time slot of port 3 to the end of the next own time slot.

Then, in Step S43, the data that are no longer necessary are destructed and the system controller 4 proceeds to Step S44. Thus, for example, if a command for reversal replaying is detected in the time slot of port 2 as shown in FIG. 13, the data stored in Bank A in the last own time slot and the data stored in Bank B in the time slot of port 4 are no longer necessary so that they will be destructed.

In Step S44, the system controller 4 assigns the closest idle time slot to port 2 regardless if it is an own time slot of the port or a time slot of others and proceeds to Step S45.

Then, in Step S45, the system controller 4 determines if the time slot assigned in Step S44 is a time slot of others in that time slot cycle period or not. If it is a time slot of others in the cycle period, the system controller 4 proceeds to Step S46, whereas, if it is the own time slot in the cycle period, the system controller 4 process to Step S51. Since the assigned time slot is either that of port 5 or that of port 7 in the case of FIG. 13, the system controller 4 proceeds to Step S46.

In Step S46, a volume of data good for the next 32 frames is read out from the data storage 2 in the assigned time slot of others and stored in the predetermined bank. In the case of FIG. 13, a volume of data good for 32 frames may be stored in Bank 2 in the time slot of port 6.

Then, in Step S47, a volume of data good for the 32 frames after the next is read out from the data storage 2 in the next own time slot and stored in the predetermined bank before the operation proceeds to Step S48. In the case of FIG. 13, a volume of data good for the next 32 frames succeeding the frames used in Step S46 may be stored in Bank A.

In Step S48, the operation of reproducing the data read out in Step S46 starts at negative double speed from the beginning of the next cycle period (double speed reversal replaying) and then the system controller 4 proceeds to Step S49. Thus, in the case of FIG. 13, the data stored in Bank B will be reproduced from the beginning of the time slot of port 1 until the end of the time slot of port 4.

In Step S49, the operation of reproducing the data read out in Step S47 starts at negative double speed from the end of the reproducing operation of Step S48 and then the system controller 4 proceeds to Step S50. In the case of FIG. 13, the data stored in Bank A will be reproduced at negative double speed from the beginning of the time slot of port 5. Thus, a series of data reproducing operations will be carried on continuously.

Then, in Step S50, an idle time slot of others is assigned to port 2 before the next own time slot comes. Then, the system controller 4 returns to Step S46 and repeats the above described processing steps from Step S46 to Step S50.

In Step S51, on the other hand, a volume of data good for the next 32 frames is read out from the data storage 2 in the next own time slot and the system controller 4 proceeds to Step S52.

Then, in Step S52, the operation of reproducing the data read out in Step SS1 starts at negative normal speed from the beginning of the next cycle period (normal speed reversal replaying) and then the system controller 4 moves to Step S50, which is described above.

Thus, upon detecting the command, the operation of reversing the replay direction takes place immediately by following the above described control procedures without giving rise to the effect of a slow-speed film that can make the editor feel disagreeable.

As described above in detail, as the system controller 4 of the AV server 1 assigns more than one time slots to a port that operates in a variable speed replay mode for high speed replaying, accelerating or decelerating the replay speed or reversal replaying to increase the volume of data that the port can read from the data storage 2 in a time slot cycle period so that data can be read out from a continuous region on any of the hard disks of the data storage 2. In other words, a large volume of image data can be read out from a continuous region of the data storage 2 by a single access and any unnecessary portions of the image data can be excluded by thinning out the data at the time of reproducing the image data so that an image reproducing operation can be started quickly with the specified replay speed/replay direction without giving rise to the effect of a slow-speed film.

While the data storage 2 comprises HDDs in the above described embodiment, the present invention is not limited thereto and any non-linearly accessible (random access) recording medium can be used for the purpose of the invention. Therefore, the data storage 2 may alternatively comprises optical disks such as DVDs (digital video disks) or opto-magnetic disks such as MOs (magneto-optical disks). Still alternatively, the data storage 2 may comprise semiconductor memories such as DRAMs or flash memories.

Additionally, while a time slot cycle period is divided by the number of ports in the above described embodiment, the present invention is by no means limited thereto. Thus, alternatively, a time slot cycle period may be divided by a number greater than that of ports to provide so-called one or more than one spare time slots. Then, if all the ports are busy, one or more than one time slots may be assigned to the port to be operated at variable speed to improve the operability of the entire system.

Finally, while the above embodiment is described in terms of replaying at variable speed between positive double speed and negative double speed, the present invention is by no means limited thereto and a data reproducing apparatus according to the invention may be made to adapt itself to a greater magnification ratio of replay speed such as ±N times, where N is a number greater than 2. If such is the case, the system controller 4 may well operate so as to assign N time slots to the port to be operated at variable speed in order to reflect the desired magnification ratio.

What is claimed is:

1. A data reproducing apparatus characterized by comprising:

a data accumulation means including a non-linearly accessible recording medium for accumulating data including video data;

a plurality of data reproducing means adapted to storing the data read out from said data accumulation means in respective memories, converting said data stored in the memories to a predetermined data format and outputting the data; and a control means for allocating time slots to said data reproducing means with a predetermined cycle period and controlling said data reproducing means so as to cause them to read out said data from said data accumulation means and store them in said respective memories in said respective time slots;

each of said memories including at least three banks, each having a capacity for storing data for the time slots of each said predetermined cycle period;

said control means re-assigning to the data reproducing means operating for variable speed replaying at least one of the time slots to be allocated to the remaining data reproducing means.

2. A data reproducing apparatus according to claim 1, characterized in that said data control means is adapted to re-assign to the data reproducing means operating for variable speed replaying one or more than one time slots to be allocated to the remaining idle data reproducing means.

3. A data reproducing apparatus according to claim 1, characterized in that said control means provides a number of time slots greater than the number of said data reproducing means, including one or more than one spare time slots, and assigns said one or more than one spare time slots to said data reproducing means operating for variable speed replaying.

4. A data reproducing apparatus according to claim 1, characterized in that said variable speed replaying is high speed replaying, acceleration of replay speed and/or reversal replaying.

5. A data reproducing apparatus according to claim 1, characterized in that said non-linearly accessible recording medium takes the form of hard disk and said data accumulation means comprises a plurality of hard disks.

6. A data reproducing method for a plurality of data reproducing means to read data from a non-linearly accessible recording medium, store them in respective memories of said data reproducing means and convert them to a predetermined format before outputting them in the respective allocated time slots, characterized by comprising:

a first step of re-assigning to the data reproducing means operating for variable speed replaying at least one of the time slots to be allocated to the remaining data reproducing means; and a second step of causing said data reproducing means to read out data corresponding to the time period of said assigned plurality of time slots from said recording medium in the assigned time slots of said predetermined cycle period and store them in said memory.

7. A data reproducing method according to claim 6, characterized in that said first step is used to re-assign to the data reproducing means operating for variable speed replaying one or more than one time slots to be allocated to the remaining idle data reproducing means.

8. A data reproducing method according to claim 6, characterized in that a number of time slots greater than the number of said data reproducing means, including one or more than one spare time slots, are provided and said one or more than one spare time slots are assigned to said data reproducing means operating for variable speed replaying.

9. A data reproducing method according to claim 6, characterized in that said variable speed replaying is high speed replaying, acceleration of replay speed and/or reversal replaying.

10. A data reproducing method according to claim 6, characterized in that said non-linearly accessible recording medium comprises a plurality of hard disks.

11. A data reproducing apparatus characterized by comprising:

a data accumulation means including a non-linearly accessible recording medium for accumulating data including video data;

a plurality of data reproducing means adapted to read data from said data accumulation means, store said data into one of at least three banks constituting each of the memories belonging respectively to said data reproducing means and output the stored data in allocated time slots; and a control means for allocating time slots to said data reproducing means;

upon receiving a control command for double speed replaying, the data reproducing means with the received control command reading out data corresponding to the time period of said allocated time slots of a predetermined cycle period from said data accumulation means in the closest first one of the time slots allocated by said control means, thinning out said data so as to be output continuously during the time period down to the third time slot allocated by said control means to the data reproducing means with the received control command, if said first time slot not being the time slot allocated to any of the remaining data reproducing means in the time slot cycle period of receiving said control command, and outputting said thinned out data from said first bank;

said control means re-assigning the second time slot to be allocated to any of the remaining data reproducing means during said time period from said first time slot to the third time slot to said data reproducing means with the received control command.

12. A data reproducing apparatus according to claim 11, characterized in that, if said first time slot is the time slot allocated to any of the remaining data reproducing means in the time slot cycle period of receiving said control command, said data reproducing means with the received control command thinning out said data stored in said first bank so as to be able to output the data within a period equal to a half of the period from the time of receiving said control command to the fifth time slot to be allocated to said data reproducing means with the received control command in the time slot cycle period after the next, outputting said thinned out data, reading out said data from the data accumulation means and storing the data into said second bank in the fourth time slot closest to said first time slot and outputting said data stored in the second bank continuously and immediately after the output of said data from said first bank within the period down to said fifth time slot.

13. A data reproducing apparatus according to claim 12, characterized in that, if said fourth time slot is not the time slot allocated to the data reproducing means with the received control command, said control means assigns one or more than one time slots to be allocated to any of the remaining data reproducing means to said data reproducing means with the received control command.

14. A data reproducing apparatus according to claim 12, characterized in that said data reproducing means with the received control command reads out said data from said data accumulation means and stores the data into the third bank in said fifth time slot and outputs said data with the magnification ratio indicated by said control command.

15. A data reproducing apparatus according to claim 11, characterized in that said non-linearly accessible recording medium comprises a plurality of hard disks.

16. A data reproducing method for a plurality of data reproducing means to read out data from a non-linearly accessible recording medium in the respective time slots allocated to them, storing them into one of at least three banks constituting each of the memories belonging respectively to said data reproducing means and outputting the stored data, characterized by comprising:

a first step of reading out data corresponding to the time period of said allocated time slots of a predetermined cycle period in the closest first one of the time slots allocated to the data reproducing means receiving a control command for double speed replaying and storing the data in the first bank of the memory of said data reproducing means;

a second step of thinning out said data so as to be output continuously during the time period down to the third time slot allocated by said control means, if said first time slot not being the time slot allocated to any of the remaining data reproducing means in the time slot cycle period of receiving said control command, and outputting said thinned out data from said bank;

a third step of re-assigning the second time slot to be allocated to any of the remaining data reproducing mean s during said time period from said first time slot to the third time slot to said data reproducing means with the received control command; and a fourth step of storing said data corresponding to the time period of said time slots of a predetermined cycle period into the second bank of said memory and outputting said data for sad double speed replaying in the time slot assigned in said third step.

17. A data reproducing method according to claim 16, characterized in that it further comprises:

a fifth step of thinning out said data stored in said first bank so as to be able to output the data within a period equal to a half of the period from the time of reproducing means with the received control command in the time slot cycle period after the next and outputting said thinned out data, a sixth step of reading out said data from said recording medium by a volume good for the time slots of a cycle period and storing the data into said second bank in the fourth time slot closest to said first time slot allocated to said data reproducing means with the received control command;

a seventh step of thinning out said data stored in the second bank in said sixth step so as to be able to output the data continuously and immediately after the output of said data from said first bank within the period down to said fifth time slot and outputting the data; and an eighth step of reading out said data from said recording medium by a volume good for the time slots of a cycle period, storing the data in said memory and outputting the data for said double speed replaying in said fifth time slot;

provided that said first time slot is the time slot allocated to any of the data reproducing means other than the data reproducing means with the received control command in said first step.

18. A data reproducing method according to claim 16, characterized in that said non-linearly accessible recording medium comprises a plurality of hard disks.

19. A data reproducing apparatus, characterized by comprising:

a data accumulation means including a non-linearly accessible recording medium for accumulating data including video data;

a plurality of data reproducing means adapted to read data from said data accumulation means, store said data into one of at least three banks constituting each of the memories belonging respectively to said data reproducing means and output the stored data in allocated time slots; and a control means for allocating time slots to said data reproducing means;

upon receiving a control command for reversing the replaying direction, the data reproducing means with the received control command outputting the data stored in the first bank of said memory in the reverse direction during the time period down to the second time slot allocated to said data reproducing means and destroying the data stored in the second and third banks of said memory, thereby reading out data corresponding to the time period of the time slots of a predetermined cycle period continuously from said recording medium in the closest first time slot assigned to said data reproducing means with the received control command from the time of receiving said control command in the direction reverse to that of said data output from said first bank and storing said data into the second bank.

20. A data reproducing apparatus according to claim 19, characterized in that, if said fist time slot is the time slot allocated to any of the data reproducing means other than the data reproducing means with the received control command, said control means assigns said time slot to the data reproducing means with the received control command.

21. A data reproducing apparatus according to claim 19, characterized in that, if said first time slot is the time slot allocated to it in the time slot cycle period, it outputs said data stored in said second bank with a magnification ratio indicated by said control command.

22. A data reproducing method for a plurality of data reproducing means to read data from a non-linearly accessible recording medium, store said data in respective banks in memories of said data reproducing means and convert said data to a predetermined format before outputting the data in respective allocated time slots, comprising:

a first step of, upon receiving a reverse replay direction control command, outputting the data stored in a first bank of a memory of the data reproducing means in response to the received control command in the reverse direction during a time period down to a second time slot allocated to said data reproducing means;

a second step of destroying the data stored in second and third banks of said memory;

a third step of reading out data corresponding to the time period of the time slots of a predetermined cycle period continuously from said recording medium in the closest first time slot assigned to said data reproducing means in response to the received control command from the time said control command is received, the data being read out in the direction reverse to that of said data output from said first bank and storing said read out data in the second bank; and a fourth step of outputting said data stored in said second bank at a rate corresponding to a magnification ratio of replay speed as determined by said control command.

23. A data reproducing method according to claim 22, characterized in that, if said first time slot is the time slot allocated to any of the data reproducing means other than the data reproducing means with the received control command, said time slot is assigned to the data reproducing means with the received control command.

24. A data reproducing method according to claim 22, characterized in that it further comprises:

a fifth step of outputting said data stored in said second bank with the magnification ratio indicated by said control command;

provided that said first time slot is the time slot allocated to it in the time slot cycle period in said third step.

* * * * *

UNITED STATES PATENT AND TRADEMARK OFFICE
CERTIFICATE OF CORRECTION

PATENT NO.     : 6,711,344 B1
DATED          : March 23, 2004
INVENTOR(S)    : Ito et al.

It is certified that error appears in the above-identified patent and that said Letters Patent is hereby corrected as shown below:

<u>Title page,</u>
Item [75], should read as follows:
-- [75]    Inventors:    Norikazu Ito, Kanagawa (JP);
                         Hiroyuki Fujita, Kanagawa (JP);
                         Satoshi Yoneya, Kanagawa (JP);
                         Masakazu Yoshimoto, Kanagawa (JP);
                         Satoshi Katsuo, Kanagawa (JP);
                         Jun Yoshikawa, Kanagawa (JP);
                         Satoshi Yutani, Kanagawa (JP);
                         Koichi Sato, Tokyo (JP);
                         Tomohisa Shiga, Kanagawa (JP);
                         Masaki Hirose, Kanagawa (JP) --

Signed and Sealed this

Twenty-fifth Day of May, 2004

JON W. DUDAS
*Acting Director of the United States Patent and Trademark Office*